United States Patent

Ito et al.

[11] Patent Number: 6,163,124
[45] Date of Patent: Dec. 19, 2000

[54] ROBOT CONTROLLER

[75] Inventors: Takayuki Ito, Rochester Hills, Mich.;
Toru Shirahata, Yamanashi, Japan;
Atsuo Nagayama, Auburn Hills, Mich.;
Kazuto Hirose, Tokyo, Japan

[73] Assignee: Fanuc Ltd., Yamanashi, Japan

[21] Appl. No.: 09/210,627

[22] Filed: Dec. 14, 1998

[30] Foreign Application Priority Data

Dec. 12, 1997 [JP] Japan .................................... 9-362300

[51] Int. Cl.$^7$ .................................................. G05B 19/10
[52] U.S. Cl. .................... 318/567; 318/568.15; 318/573; 318/574; 318/560; 395/87; 395/92
[58] Field of Search ..................... 318/567, 574, 318/560, 568.15, 573; 395/80–82, 83–85, 87, 92

[56] References Cited

U.S. PATENT DOCUMENTS

| | | | |
|---|---|---|---|
| 4,554,497 | 11/1985 | Nozawa et al. | 318/636 |
| 4,616,326 | 10/1986 | Meier et al. | 364/513 |
| 4,706,003 | 11/1987 | Nakashima et al. | 318/568 |
| 4,740,885 | 4/1988 | Gose et al. | 364/149 |
| 4,894,596 | 1/1990 | Hara | 318/568.1 |

Primary Examiner—Robert E. Nappi
Assistant Examiner—Rita Leykin
Attorney, Agent, or Firm—Staas & Halsey

[57] ABSTRACT

A robot controller resolving a path deviation caused in relation to override processing or temporary stop. A motion planning section constituting software of the robot controller forms a motion plan of a robot with no consideration of overriding and outputs it to an interpolation processing section. The interpolation processing section carries out interpolation processing at each period of calculation processing, calculates a motion amount at each ITP and outputs it to a filtering section. An output filtered for acceleration or deceleration control at the filtering section is processed by an overriding processing section having an operational shutter. An output after the processing to which an override value $\beta$ ($0 \leq \beta \leq 1$) common to respective axes has been applied is constituted by velocity and acceleration respectively multiplied by $\beta$ and $\beta^2$. Acceleration or deceleration of two operation is uniformly exhausted at a corner portion where two operation overlap and, therefore, path error is not caused. Even when overriding is changed in passing through the corner portion, operation is similarly carried out. By gradually changing overriding in deceleration and acceleration before and after a temporary stop, path deviation accompanied by a temporary stop can also be resolved.

14 Claims, 16 Drawing Sheets

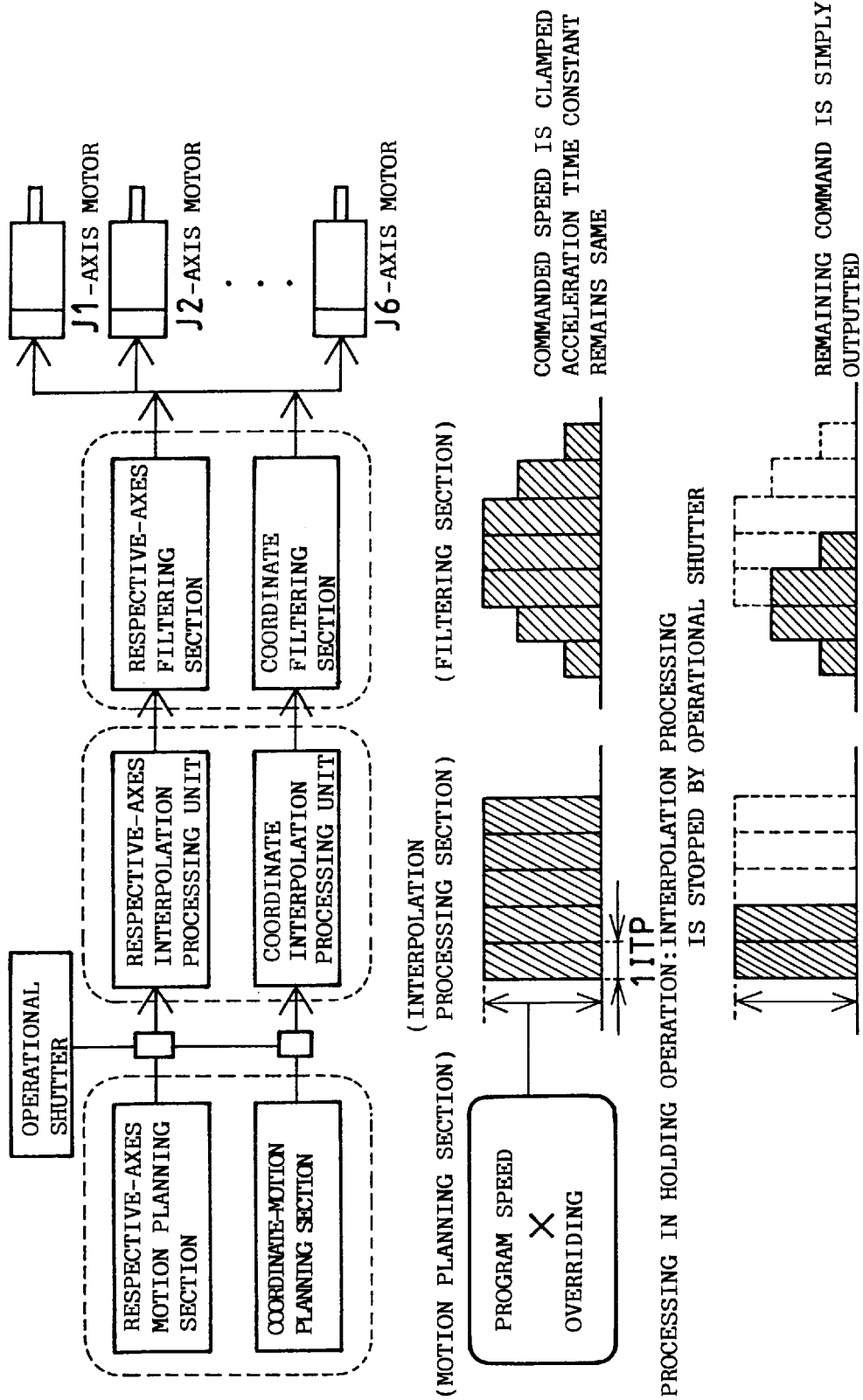

FIG. 2a
PROGRAM
1. STRAIGHT-LINE  POSITION [1]  2000mm/sec.  SMOOTH 100
2. STRAIGHT-LINE  POSITION [2]  1000mm/sec.  POSITIONING
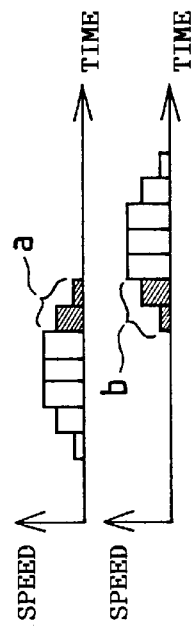
FIG. 2b
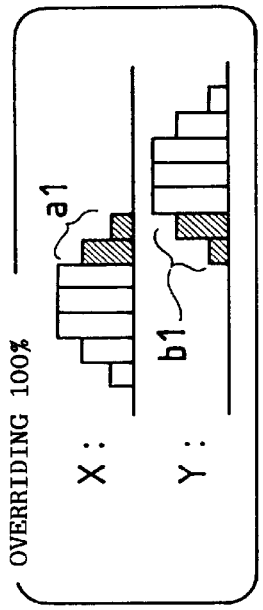
FIG. 2c
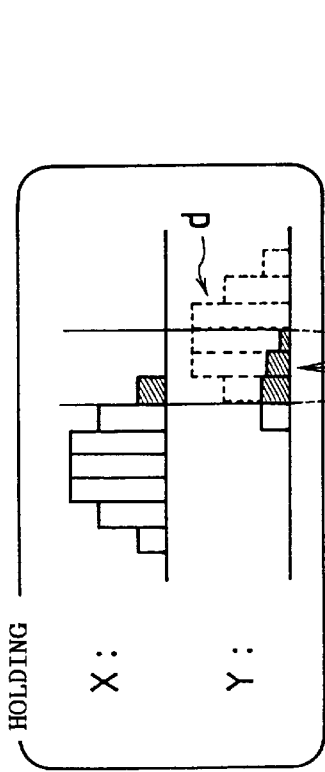
FIG. 2e
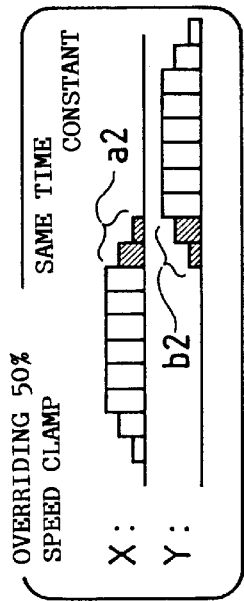
FIG. 2d

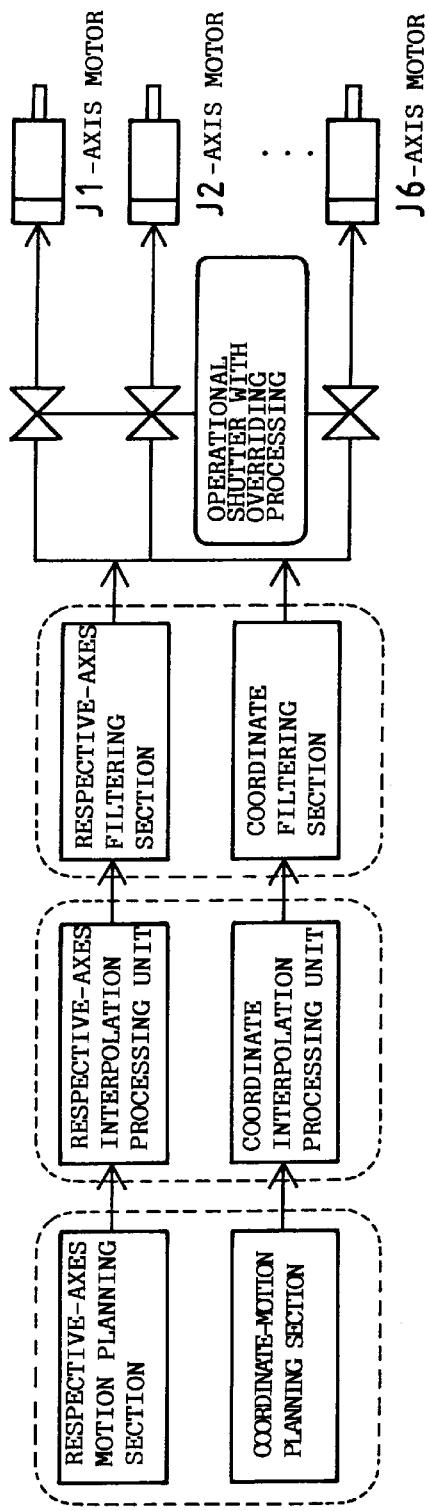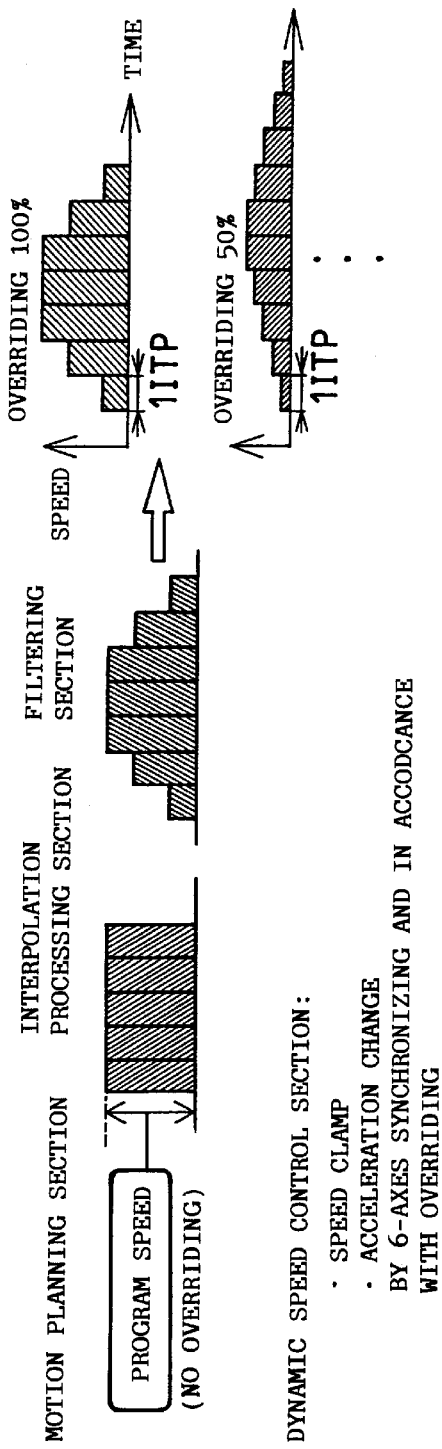

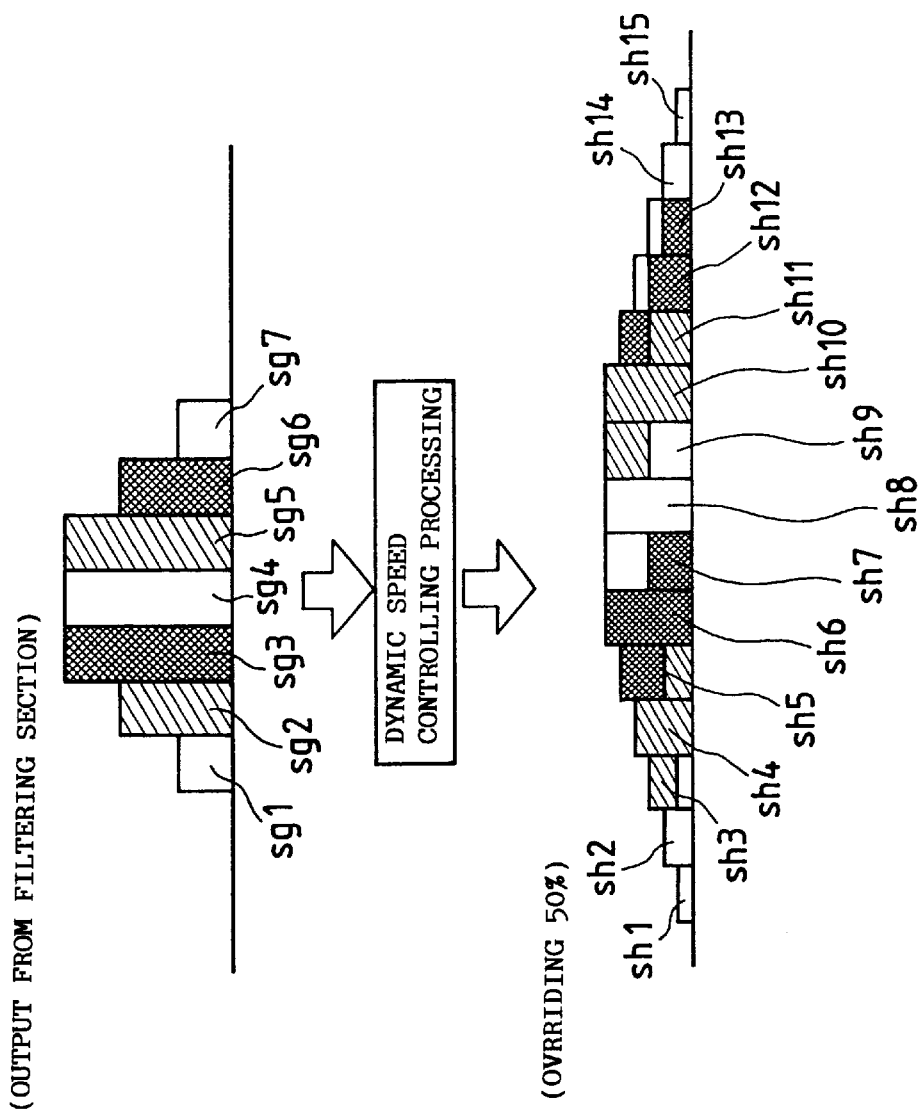
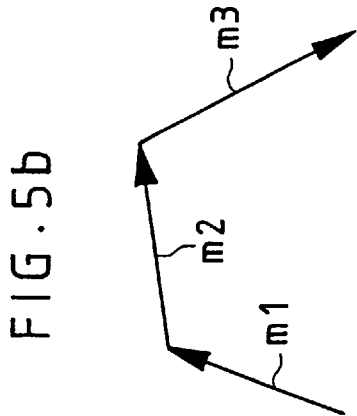
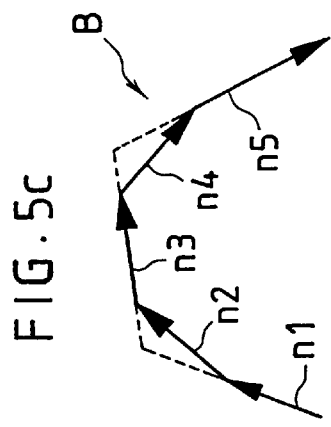

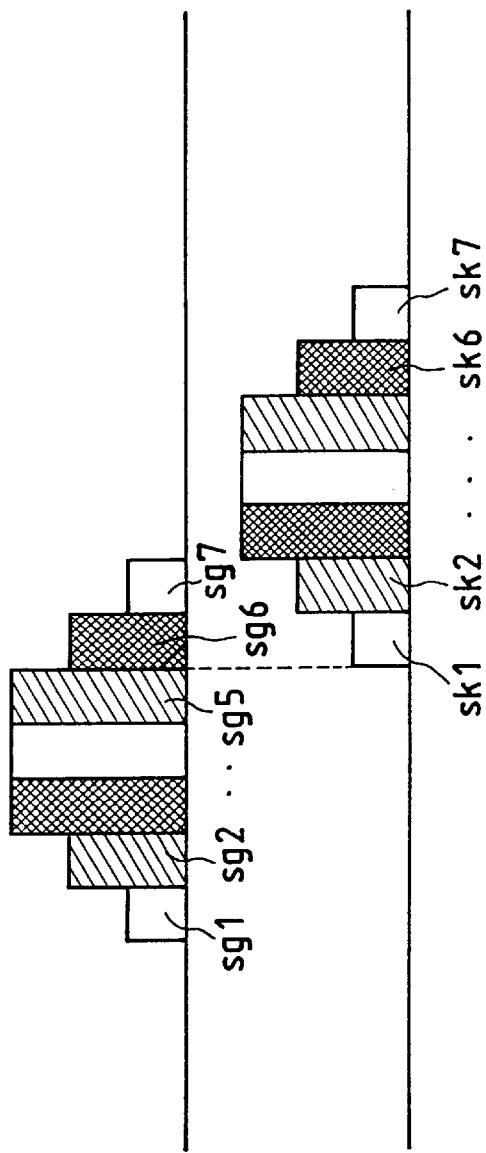
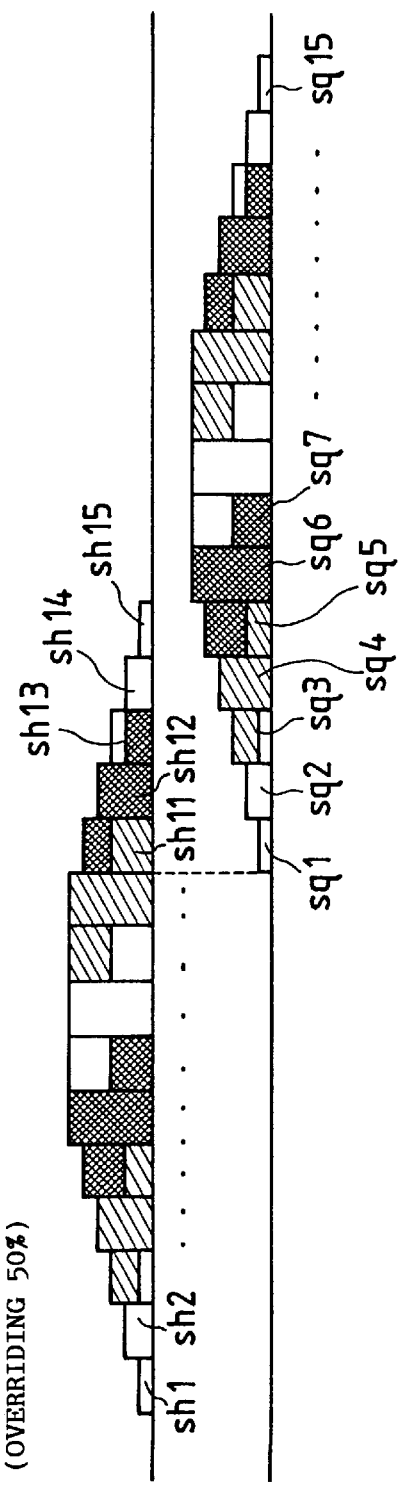

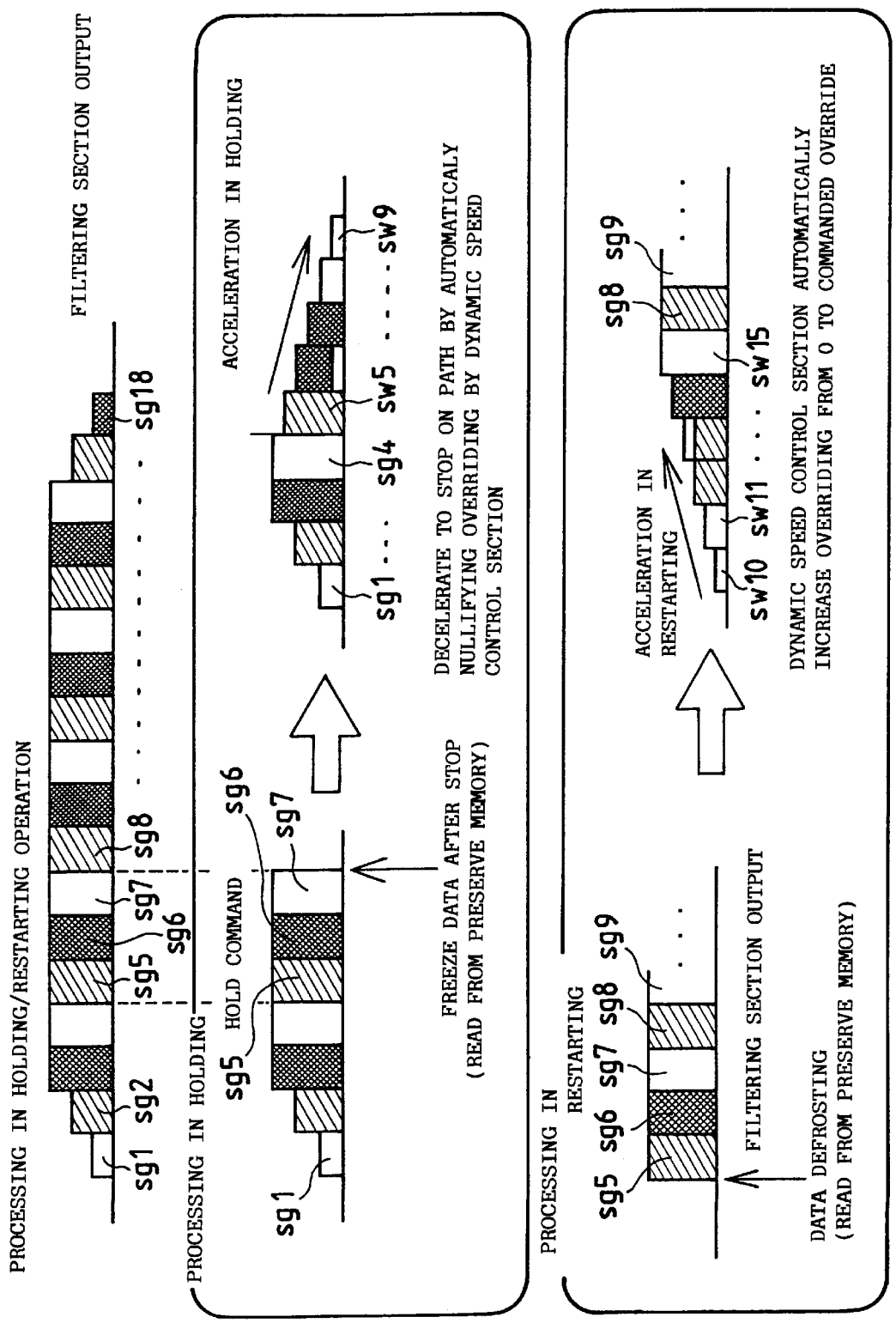

B) CASE OF ACCELERATING OR DECELERATING PORTION

CASE OF ACCELERATION

OVERRIDING 100%

OVERRIDING 30%

MOTION AMOUNT Dm'-n TO BE ACCELERATED SMOOTHLY AT SPEED OF 30%

1 MOTION AMOUNT PER INTERPOLATION

OUTPUT TO MOTOR

1 MOTION AMOUNT PER INTERPOLATION

OUTPUT TO MOTOR

D1 = D1'-1 + D1'-2 + D1'-3 + D1'-4 ived with a property in which the lower the designated
ROBOT CONTROLLER

BACKGROUND OF THE INVENTION

1. Field of the Invention

The present invention relates to a controller for controlling an industrial robot, and particularly to a robot controller capable of improving an accuracy of a motion path of a robot in overriding operation or before and after a temporary stop.

2. Description of the Related Art

When a robot needs to move at a speed lower than a speed designated by an operation program (hereinafter, referred to as "program speed"), there is widely used a method of overriding a lowering operational speed by a constant rate in respect of program speed. For example, with regard to an operation program which is newly created or modified, a play-back operation (test run) is carried out by designating overriding at a low rate to thereby confirm a motion path while avoiding danger.

An operation program in which path is confirmed to be proper is played back by a controller of a robot in charge of actual operation and it is common practice to set overriding which is designated in play back operation to "100%" instructing motion in accordance with the program speed or to a high rate near thereto.

However, in the case of using a conventional robot controller, there causes a deviation between a path which is realized when movement speed is lowered by overriding and a path which is realized at the program speed (when overriding is designated to 100%). The path deviation is provided with a property in which the lower the designated override value, the larger it becomes. That is, when a robot comes near to a corner portion during operation under overriding at a low rate, except when positioning is carried out at a corner, in any of respective operational styles of axial and linear motion and circular motion, path of a front end point of a tool is varied considerably by a designated override value.

Accordingly, in confirming an actual path, it is the current state to try to confirm an accurate path by starting operation designated with overriding at a low rate and repeating a test run while gradually increasing overriding. Such a deviation in path is caused not only in designating overriding at a low rate but also in changing the override value during movement or before and after temporary stop of a robot (in deceleration and acceleration) with similar modes.

After all, according to the conventional technology, a long period of time is required in repetition of a test run after instructing positions until a robot is operated with overriding at 100%. Further, when a processing of temporary stop is carried out in program reproducing operation, in accordance with deceleration, a position of a front end point of a tool is deviated from a path of the tool center point which is drawn in normal operation where the processing of temporary stop is not carried out (hereinafter, referred to as "normal path") and is stopped at a position which is not present on the normal path. Incidentally, in this specification, "temporary stop" does not include "emergency stop" signifying that outputs for instructing movement of servos are instantaneously stopped in response to an output of alarm.

Similarly, path of the tool center point immediately after restarting the program reproduction after temporary stop is also deviated from the normal path and considerable distance of movement is required for the tool to coincide with the normal path. Such a deviation in path constitutes cause of making an end effector such as a robot hand or the like interfere with an outside object jig, workpiece, other installed device or the like).

FIG. 1 shows an outline of processing according to a conventional system which are carried out by a robot controller from motion planning to outputting of motion commands to a servo system in a play-back operation of a program in order to investigate the above-described problem. A total of normal processing in accordance with the conventional system can grossly be classified into a motion planning section, an interpolation processing section and a filtering section and the respective sections can be classified into two of a series for respective-axes motion and a series for coordinate motion (straight-line motion, circular motion and so on).

The motion planning section is a section for creating a motion plan for a robot in accordance with designated content of the operation program (target motion position, motion style, program speed or the like) in which when a motion style designated by the operation program is respective-axes motion, the motion plan is created at an axial motion planning section and when the motion style designated by the operation program is coordinate motion (straight-line motion, circular motion or the like), the motion plan is created at a coordinate-motion planning section.

Overriding is considered at the motion planning section, and the program speed multiplied by overriding (percent) constitutes an instruction speed output in respect of the interpolation processing section. A block functioning as an operational shutter for controlling transmittance of the instruction speed output from the motion planning section to the interpolation processing section is installed between the motion planning section and the interpolation processing section. The operational shutter is opened at each time of creating the instruction speed output for conveying the instruction speed output to the interpolation processing section.

Upon receiving the instruction speed output, the interpolation processing section carries out interpolation processing on each axis or on an orthogonal coordinate system at each calculation processing period (ITP) and calculates and outputs a motion amount at each ITP. At the filter section successive thereto, filtering is carried out in respect of an output from the interpolation processing section with a predetermined time constant. The processing is carried out to make movement of acceleration/deceleration smooth by controlling acceleration/deceleration of the robot.

Outputs which have been filtered at respective axial filter processing sections are also outputted to servos of respective axes (J1 through J6) after having been filtered. Further, in case of coordinate motion, a processing of so-called inverse transformation is needed to carry out transformation from an orthogonal coordinate system to the respective axial coordinate systems. Although in respect of the processing of inverse transformation, the inverse transformation is frequently carried out before the filtering operation, it may be carried out after the filtering operation.

When an instruction of a temporary stop is outputted at inside of the robot controller in play-back operation, the interpolation processing section is held by reverting the operational shutter to OFF and the interpolation processing is interrupted. An output which has been formed by the interpolation processing before outputting hold instruction, is outputted to a servo after having been filtered at the filtering section. When the motion command outputted to the servo is exhausted by moving each axis, the input to the servo is stopped and the robot is stopped.

When a path smoothly connecting two operations is designated by the operation program, two operational instructions are processed in superimposed manner. In such a case, when a tangential direction of movement at an end point of former operation in the two operations and a tangential direction of movement at a start point of latter operation differ from each other, a rounded corner is formed. An overlap amount of motion at this occasion controls a shape of a pivoting inner periphery of the corner.

At this occasion, consider a relationship between high or low of overriding and the overlap amount of motion. When overriding is low, the instruction speed is naturally lowered, but, time constant of acceleration or deceleration processing at the filter section remains unchanged, so that, the overlap amount of motion is reduced. This signifies that an amount of the pivoting inner periphery of the corner is reduced (that is, radius of curvature of roundness is reduced). Conversely, when overriding is high, the instruction speed is naturally increased and the overlap amount of motion is increased under the time constant of acceleration or deceleration processing at the same filtering section. As a result, amount of the pivoting inner periphery of the corner is increased (that is, radius of curvature of roundness is increased).

An explanation will be given of the above-described phenomenon by a simple example in reference to FIGS. 2a, 2b, 2c, 2d and 2e. According to the example, there is considered an operation program in which operation of linearly moving toward position [1] at 2000 mm/sec and operation of linearly moving toward position [2] at 1000 mm/sec and stopping (positioning) with smoothness of 100%. In order to study a phenomenon accompanied by passing the corner, assume a case in which a linear path toward position [1] is directed in −X-axis direction and a linear path toward position [2] is directed toward +Y-axis direction. Transition of instruction speed outputs after filtering the respective operations is illustrated in parallel in FIG. 2b and notations "a" and "b" generally represent overlap of the operations.

Now, assuming that 100% is set as high overriding and 50% is set as low overriding, overlaps a1 and b1 after filtering in overriding at 100% and overlaps a2 and b2 after filtering in overriding at 50% are respectively shown in FIG. 2c. That is, the filtering operations are carried out with the same time constant regardless of the fact that overriding operations differ from each other by a factor of 2 and, therefore, considerable difference is caused in the overlap amount of motion. As a result, realized loci differ from each other as shown by notations c1 and c2 in FIG. 2d. Roundness of the corner portion is large in c1 and small in c2.

Next, consider a case in which movement is held by temporary stop at point β in passing the corner represented by position [1] in case of overriding at 100%. As shown in FIG. 2e, after time point "t" at which the movement is held, an output from the interpolation processing section for operation moving toward position [2] is rapidly reduced compared with the case in which the movement is not held (designated by broken line "d") and only remaining instruction is outputted. Therefore, an effect of rapidly reducing overlap of two operations after filtering is resulted at a midway of movement at the corner.

As a result, the path is shifted from point P in correspondence with the time point "t" at which the movement is held to a side of position [2] as a representative point of the corner to thereby constitute path c3 and is stopped at point Q which is deviated from path c1 in the case in which the movement is not held (caution is required to the fact that the movement toward position [1] is exhausted). When the reproduction is restarted after the temporary stop, the path of the robot follows path designated by notation c4 from point Q (it coincides with c1 at a midway).

It is apparent that a path deviation phenomenon similar thereto is caused also in the case in which overriding is switched in passing the corner. This is because the filtering is carried out under the same time constant and, therefore, overlap amount of two operations is varied in accordance with large or small of an output from the interpolation processing section and, as a result, path is changed.

That is, in the various cases of causing the path deviation (high or low of overriding, switching of overriding during operation, before and after temporary stop), there is constituted a common factor in which transition of an input level in the filtering operation differs from that in normal operation. It can be considered that a difference is caused in an operational path at a portion where different operations in two directions overlap since the filtering operation is carried out under the same time constant even when the input level in the filtering operation is varied.

SUMMARY OF THE INVENTION

It is an object of the present invention to provide a robot controller capable of resolving path deviation caused in the conventional technology by the common factor. That is, it is an object of the present invention to provide a robot controller capable of preventing deterioration in path accuracy in high or low of overriding, switching of overriding during operation or before and after temporary stop.

Further, thereby, according to the present invention, the deviation between a path in a test run after instruction and a path in operation of high overriding is resolved and efficiency and safety of operation of confirming the path is promoted. Further, according to the present invention, accuracy and safety of robot operation is also achieved by eliminating path deviation accompanied by switching overriding during operation or temporary stop.

The present invention is applied to a robot controller having software means for outputting motion command to a servo system of servo motors for driving respective axes of a robot.

A robot controller according to the present invention comprises motion plan creating means for creating a motion plan based on an operation program, interpolation processing means for subjecting an output from the motion plan creating means to an interpolation processing at a predetermined period, filtering processing means for subjecting an output from the interpolation processing means to a filtering processing for an acceleration/deceleration control, and overriding processing means for inputting data subjected to the filtering processing by the filtering processing means and carrying out a dynamic overriding processing in respect of the data by using a designated override value common to the respective axes such that a path at a front end point of a tool of the robot is not changed.

When the override value is changed in executing the operation program, the overriding processing is carried out such that the path of the tool center point of the robot is not changed. And, when the robot is temporarily stopped in executing the operation program, the dynamic overriding processing is carried out such that the override value is lowered to 0 and the tool center point is decelerated to stop along the path of the tool center point drawn in normal operation.

Further, when the operation is restarted after temporarily stopping the robot in executing the operation program, the dynamic overriding processing is carried out such that the override value is increased from 0 and the tool center point is accelerated along the path of the tool center point drawn in the normal operation and is moved with the same path and the same speed as those before the temporary stop.

Further, when the operation is restarted after the robot has been stopped in emergency stop in executing the operation program, the dynamic overriding processing is carried out such that motion command representing movement of the tool center point for returning onto the path of the tool center point drawn by the normal operation is outputted to the servo system, and, thereafter, the override value is increased to a predetermined value and the tool center point is accelerated along the path and is moved with the same path and the same speed as those before the emergency stop.

It is preferable in the dynamic overriding processing that in changing the override value, a current value of overriding is gradually changed toward a target value.

Further, it is preferable to preserve operational data at a vicinity of a time point of temporary stop and utilize the preserved operational data in restarting the operation.

Incidentally, the motion plan creating means forms a coordinate-motion plan in respect of an operational section in which straight-line motion is designated by the operation program and forms respective axis motion plans in respect of an operational section in which respective axis operations are designated. According to the present invention, in respect of operation in accordance with an operational style of either of coordinate motion and respective axis operation, deviation of path accompanied by high or low of the override value or temporary stop/restarting operation can be resolved.

BRIEF DESCRIPTION OF THE DRAWINGS

FIG. 1 is a view showing an outline of processings according to a conventional system which is carried out at inside of a robot controller from motion plan to outputting instruction of movement to servos in program reproduction;

FIGS. 2a, 2b, 2c, 2d and 2e are views for explaining reason of causing path deviation by using a simple example in relation to the processings of the conventional system shown in FIG. 1;

FIGS. 4a and 4b are views for explaining in a style similar to that in FIG. 1 an outline of processings executed at inside of the robot controller from motion plan to outputting instruction of movement to servos in program reproduction according to an embodiment of the present invention;

FIGS. 5a, 5b and 5c are views for explaining an overriding processing with an example of a case in which overriding of 50% is applied to an output from a filtering section;

FIGS. 6a and 6b are views for explaining influence of overriding processing in respect of a case in which operation represented by segments sg1 through sg7 and operation represented by segments sk1 through sk7 overlap under a relationship in which segments sg6 and sg7 and segments sk1 and sk2 are brought into synchronism with each other;

FIG. 7 is a view for explaining of processings related to temporary stop according to the embodiment;

DETAILED DESCRIPTION OF THE PREFERRED EMBODIMENTS

Figure 3:
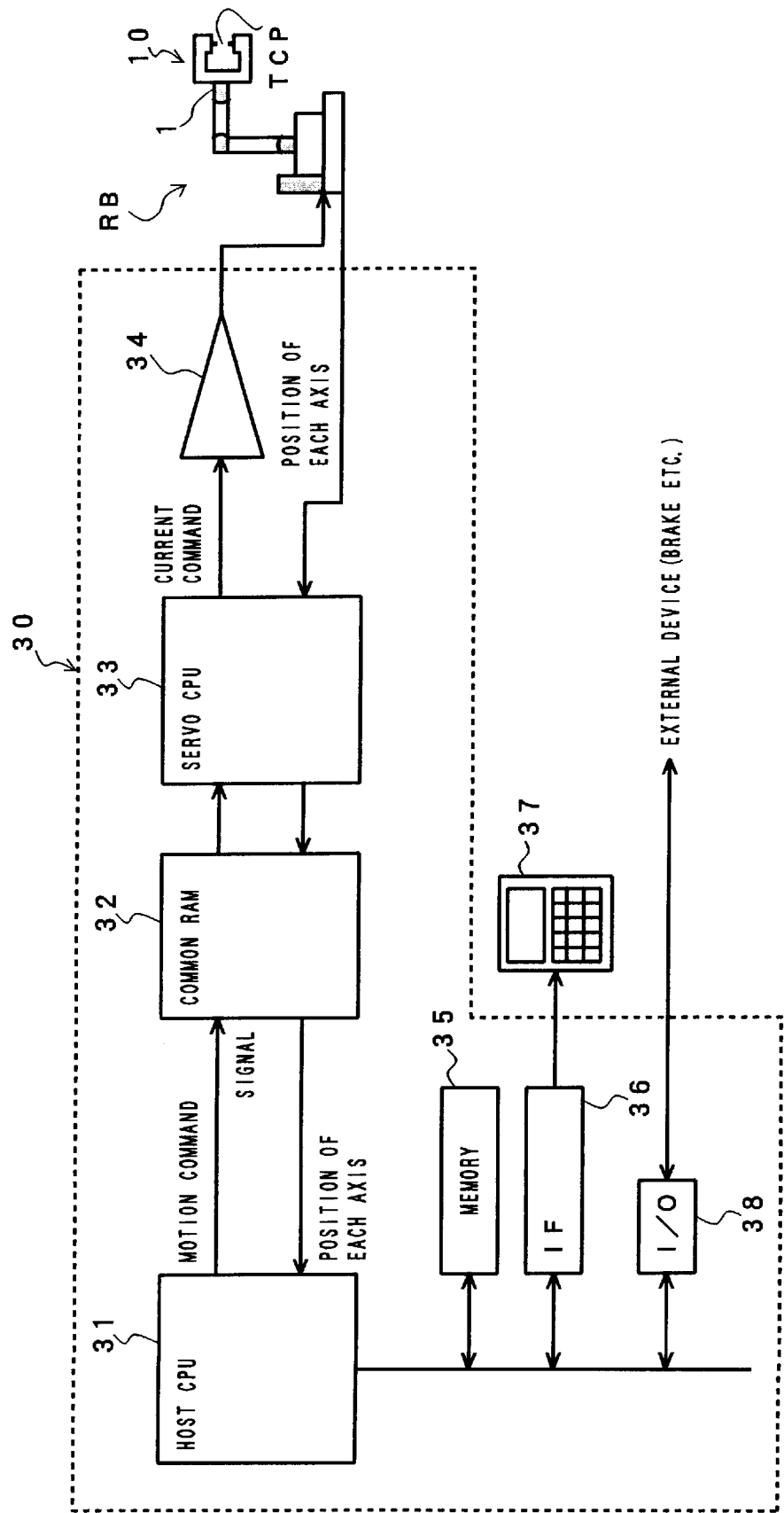
FIG. 3 is a block diagram of principal portions exemplifying the constitution of hardware of a robot system including a robot controller to which the present invention is applied.

FIG. 3 is a block diagram showing essential portions exemplifying the constitution of hardware of a robot system including a robot controller to which the present invention is applied. As shown in FIG. 3, a robot controller 30 controls a robot RB attached with a hand 10 as an end effector at an arm front portion 1. In this case, the robot RB is a 6-axes robot. A tool center point TCP which is a point representing a position of the end effector (hand 10) is set at a central portion of the hand 10.

The robot controller 30 is installed with host CPU 31, common RAM 32, servo CPU 33, a servo amplifier 34, a memory 35, an interface 36 for an instruction operation panel and an input/output device 38 for general outside devices. The memory 35 includes ROM stored with system programs, RAM for temporarily storing data and a nonvolatile memory stored with system (various program data for determining operation of the robot RB).

An instruction operation panel 37 connected to the interface 36 for the instruction operation panel is utilized for manual input of input, modification or registration of program data, manual feed (jog feed) instruction and play-back operation instruction. Further, the input/output device 38 for outside devices is connected with various external devices (for example, power source for welding) including a mechanical brake of the robot RB in accordance with an application.

In executing reproduction drive or manual feed (jog feed), host CPU 31 forms motion command in respect of each axis of the robot RB and outputs it to common RAM 32. Servo CPU 33 reads it at a predetermined short period, executes servo processing based on a position signal (feedback signal) transmitted from a position detector (pulse coder) of each axis of the robot and drives a servo motor of each axis of the robot by outputting current instruction to the servo amplifier 34 of each axis. Further, servo CPU 33 writes periodically to common RAM 32 current position of each axis of the robot based on the position signal (feedback signal) transmitted from the position detector (pulse coder) of each axis of the robot.

The constitution and the function mentioned above are not particularly different from those of a normal robot system. What the robot controller 30 used in this system differs from a conventional one, resides in that a processing procedure from when host CPU 31 reads program data when it forms motion commands in respect of each axis of the robot RB is improved and path deviation of the robot caused by the various factors (high or low of overriding, switching of overriding during operation, processing before and after temporary stop) can be avoided. Improved program data and related set values are stored in the memory 35. An explanation will be given as follows, focusing on the point of improvement.

As to an embodiment of the present invention, FIGS. 4a and 4b show an outline of processes executed inside of the robot controller from the motion plan to output of motion commands to servos in program reproduction.

Similar to the conventional example, a total of the process shown in FIG. 4a is provided with a motion planning section, an interpolation processing section and a filtering section, each of which is provided with a block for respective-axes motion and a block for coordinate motion and each of the sections can be classified into two of a series for respective-axes motion and a series for coordinate motion (straight-line motion, circular motion or the like).

The motion planning section is a portion of creating motion plan of the robot in accordance with designated content (motion target position, motion style, program speed or the like) of operation program in which when motion style designated by operation program is respective-axes motion, motion plan is created by a respective axial motion planning section and when motion style designated by operation program is coordinate motion (straight-line motion, circular motion or the like), motion plan is created at a coordinate-motion planning section.

At the interpolation processing section, interpolation processing is carried out on each axis or an orthogonal coordinate system at each predetermined calculation processing period (ITP) by receiving the instruction speed output, and a motion amount at each ITP is calculated and outputted. At the successive filtering section, filtering is carried out in respect of an output from the interpolation processing section with predetermined time constant for controlling acceleration/deceleration. An output from each axial interpolation processing section is filtered at each axial filter processing section.

Although the block constitution mentioned above is common to a conventional one, it differs basically from the conventional one in respect of a stage in consideration of overriding. That is, as mentioned above, according to the conventional processing, overriding is considered in the processing of the motion plan, an output after being multiplied with an override value is conveyed to the interpolation processing section via the operational shutter, whereas according to the embodiment the operational shutter is installed at a post stage of the filtering section in accordance with the feature of the present invention.

Further, in accordance therewith, the block of the operational shutter is shifted to the post stage of the filtering section.

Overriding is considered at the override processing section (dynamic speed control section) having the operational shutter and an output from the filter section multiplied with override (percent) is distributed and outputted to a servo of each axis (J1 through J6). An output from the orthogonal interpolation processing section is filtered at the orthogonal filter processing section and is distributed and outputted to a servo of each axis (J1 through J6) after inverse transformation. The output from the orthogonal interpolation processing section undergoes processing of inverse transformation in being distributed to each axis.

When an instruction of temporary stop is outputted at inside of the robot controller in play-back operation, hold instruction is effected not on the interpolation processing section but on the overriding section (output from filter section) by reverting the operational shutter to OFF.

A description will be given of an outline of processing constituting a feature of the embodiment as follows by being divided into overriding related processing and temporary stop related processing.

(1) Outline of Overriding Related Processing;

According to the embodiment, as shown in FIG. 4b, overriding is not considered at the motion planning section and interpolation processing is carried out in respect of an input in accordance with the program speed. An output after interpolation processing is filtered at the successive filtering section under a predetermined time constant. It is apparent that there is no room where the processing is controlled by overriding until this stage. Accordingly, no influence is effected on output from the filtering section even when overriding is high or low or even when a rate of overriding is switched in the midst of operation.

In the successive processing of overriding, an output from the filtering section is modified to satisfy the following condition equations (1) and (2). Incidentally, the override value is designated by $\beta\%$ ($0 \leq \beta \leq 100$), speed representing the output from the filtering section is designated by Vflout, acceleration is designated by aflout, speed representing an output after overriding processing is designated by Vovout and acceleration thereafter is designated by $\alpha$ovout.

$$\alpha ovout = \alpha flout \times (\beta/100)^2 \quad (1)$$

$$Vovout = Vflout \times (\beta/100) \quad (2)$$

FIGS. 5a, 5b and 5c show overriding processing when overriding of 50% is applied to the output from the filtering section. In the overriding processing, an output is formed by dividing instruction while bringing all the axes in synchronism with each other. Now, assuming that the output from the filtering section is represented by 7 segments (motion command) sg1 through sg7, the segments sg1, sg2, ..., sg7 are outputted by being divided into a total of 15 segments by using 15 ITPs.

For example, a half of sg1 is outputted by sh2 and two of ¼ thereof are outputted by sh1 and sh3. Further, a half of sg4 is outputted by sh8 and two of ¼ thereof are outputted by sh7 and sh9. Each segment sh in outputting is generally constituted by overlapping motion amounts derived from a plurality of segments sg of the output from the filtering section except both end portions. Now, when motion amounts in correspondence with sg1, sg2 and sg3 are represented by vectors m1, m2 and m3 as shown in FIG. 5b, segments sh1 through sh5 of outputs derived therefrom are represented by motion amounts represented by vectors n1 through n5 as shown in FIG. 5c. As the path, although the lower is the overriding, the more enhanced is the smoothness of a path, basic line of the path remains unchanged before and after the overriding processing.

Although mention will be given of a calculation equation of a motion amount at each ITP (output segment=motion amount per 1 ITP and it corresponds to an instantaneous speed value) in the overriding processing, the essential points are as follows.

1-1. A motion amount produced by multiplying each motion amount (input segment) of the output from the filtering section, which has been subjected to acceleration/deceleration processing by an override rate ($\beta/100$), is calculated.

1-2. When the motion amount calculated in accordance with 1-1 is excessively large (when equalities cannot be established since lefthand sides of Equations (1) and (2) become excessively large if it is outputted as it is), it is outputted by subtracting an excessive amount. Incidentally, at initial ITP, there causes no case in which Equations (1) and (2) cannot be satisfied since the motion amount calculated in accordance with 1-1 is excessively small ($\beta^2 \leq 100$ and, therefore, the lefthand sides of Equations (1) and (2) are not excessively small).

2. At successive ITP, a motion amount produced by again multiplying a motion amount which is not yet outputted by the override rate ($\beta/100$), is calculated. However, when the motion amount is deficient by the calculation (when Equations (1) and (2) cannot be satisfied), the amount is outputted by being added with a deficient amount. As an output of the deficient an amount, an amount of old motion command (input segment) which has not been outputted yet is preferentially selected. At second ITP and thereafter, the motion amount does not become excessive by the calculation in which the motion amount which has not been outputted yet is again multiplied by the override rate ($\beta/100$).

3. At fiurther successive ITP, in respect of motion command where a motion amount which has not been outputted is present, a motion amount again multiplied by the override rate ($\beta/100$) respectively is outputted. When the motion amount is deficient (when Equations (1) and (2) cannot be satisfied) by the calculation, the amount is outputted by being added with a deficient amount. In respect of output of the deficient amount, an amount of old motion command (input segment) which has not been outputted yet is preferentially selected. In the following, similar processing is repeated and when all of motion amounts at all of motion command are outputted, the processing will be finished.

According to such a processing, a motion amount used for acceleration, a motion amount at an acceleration portion and a motion amount at a deceleration portion become substantially constant. This signifies that an overlap amount becomes constant when two operations overlap even when overriding is changed. Therefore, a substantially constant path is realized without depending on high or low of overriding also in respect of passing through a corner portion.

FIGS. 6a and 6b show influence of overriding processing in case that operation represented by segments sg1 through sg7 and operation represented by segments sk1 through sk7 overlap under a relationship in which segments sg6 and sg7 and segments sk1 and sk2 are brought into synchronism with each other. Now, as an example, in considering a case of overriding of 50%, as has been explained in reference to FIGS. 5a, 5b and 5c, the segments sg1 through sg7 are outputted by being divided into segments sh1 through sh15. In that case, a motion amount represented by sg6 is distributed into sh11, sh12 and sh13 and a motion amount represented by sg7 is distributed into sh13, sh14 and sh15.

Similarly, also the segments sk1 through sk7 are outputted by being divided into sq1 through sq15. And, a motion amount represented by sk1 is distributed into sq1, sq2 and sq3 and a motion amount represented by sk2 is distributed into sq3, sq4 and sq5. When viewed after overriding processing, the two operations overlap at sh11 through sh15 and sq1 through sq7.

In this way, exhaust speeds of motion amounts in overlapping the operations are lowered uniformly in respect of the two operations (a half in this case) and a total motion amount which is exhausted is not changed by the override processing of 50%. Such a property remains unchanged even with other value of the override rate.

Even when the overriding is switched in the midst of operation, constant path can similarly be maintained by carrying out overriding processing similarly to the above-described example by smoothly changing a rate of dividing segments of the output from the filter section.

In this case, by respectively designating new and old override rates as ($\beta N/100$) and ($\beta 0/100$), acceleration is changed from ($\beta N/100$)$^2$ to ($\beta 0/100$)$^2$ at a midway. Therefore, at ITP immediately after instruction of changing overriding, an overriding processing output which is to be outputted is outputted after being adjusted to distribute by $1/[\beta N/(\beta 0 \times 100)]$ times.

In order to avoid influence of rapid change between the new and old override rates ($\beta N/100$) and ($\beta 0/100$), it is preferable to smoothly change the override rate from ($\beta N/100$) to ($\beta 0/100$) in steps. For that purpose, actually, a register for setting a target override value is set in a memory and a user updatingly inputs the new override value $\beta N$ to the register by which a processing of making a current override value gradually approach and reach a target override value (new override rate $\beta N$ in this case) is started.

In calculating motion amounts at respective ITPs, from ITP immediately after updating the override target value, as the override value, a value partitioning an intermediary between the old override target value ($\beta 0$) and the override target value ($\beta N$) in steps by n times ($n \geq 2$) is used and the motion amounts are calculated. For example, at j-th ITP immediately after updating the override target value, $\beta = \beta 0 + j\Delta\beta$ where $\Delta\beta = (\beta N - \beta 0)/n$, j=1, 2, . . . , n.

(2) Outline of Temporary Stop Related Processing;

FIG. 7 is a view for explaining a temporary stop related processing according to the embodiment. Here, consider as an example that in respect of output from the filtering section represented by segments of sg1 through sg18 (which may be an output after the overriding processing), output to servos until the segment sg4 has been finished and at ITP for outputting the segment sg5, hold instruction is internally outputted.

In this case, as shown in FIG. 7, data representing a motion amount of the segment sg5 onward is not outputted to servos as it is and is stored once in a predetermined memory (buffer previously set in the memory 35 in FIG. 3). However, in respect of the segments sg5, sg6 and sg7 in correspondence with a predetermined time constant (3 ITPs in this case), they are dynamically processed at the overriding processing section and the respective axes are decelerated and finally stopped. As dynamic processing for deceleration and stop, there can be adopted a processing in which by applying a method of bringing about the overriding mentioned above, the overriding target value is made 0 and the overriding is gradually lowered by being distributed by "n" times ($n \geq 2$) until 0 that is the overriding target value.

According to the example shown in FIG. 7, the segments sg5, sg6 and sg7 are distributed to sw5 through sw9. After all, sw5 through sw9 are outputted to servos in continuation to the segments sg1 through sg4 (before hold) and the robot is stopped at a time point at which the movement represented by the segments is finished. What must be noted in this case is that a total motion amount exhausted by sw5 through sw9 representing a step of deceleration is smaller than a total motion amount represented by the segments sg5, sg6 and sg7.

The extra motion amount is exhausted in a step of acceleration when the temporary stop is released and the operation is restarted. That is, when the temporary stop is released, data representing a motion amount at the segment sg5 onward is read from the memory and is outputted to servos while accelerating to the original instruction speed.

In the acceleration step, the total motion amount represented by the segments sg5, sg6 and sg7 subtracted by sw5 through sw9 which have been exhausted in the deceleration step is exhausted. Therefore, by applying the method of bringing about the overriding, there can be adopted dynamic processing in which the overriding target value is set to an override value before the temporary stop (for example, 100) and the overriding is gradually increased by being distributed by "n" times ($n \geq 2$) until the overriding target value.

After all, in restarting operation, sw10 through sw15 are outputted to servos and sg8 onward are successively outputted. A total motion amount exhausted at the segments sw5 through sw15 representing the deceleration step and the acceleration step is equal to a total motion amount represented by the segments sg5, sg6 and sg7.

By carrying out such a processing before and after the temporary stop, when the hold instruction is outputted, the robot is decelerated while maintaining the path and is stopped and, in restarting the operation, the robot can be accelerated while similarly mandating a path from the point of stop and can be shifted to the original operation.

In the holding operation, in preparation for restarting the operation, it is needless to say that motion plan data, interpolation data, filter data and the like at the deceleration and stop are frozen and preserved as they are. In the restarting operation, the operation is started from a state in which the overriding is set to 0 and data preserved in the holding operation is recovered. Thereafter, the overriding is gradually increased while again bringing all the axes smoothly into synchronism with each other. Thereby, until the motion planning section, the interpolation section and the filtering section, the deceleration, the stopping and the restarting operation can be carried out by changing the overriding with all the axes being made in synchronism while carrying out processing as if there were not holding operation.

Incidentally, in case of carrying out emergency stop by an alarm, the temporary stop method mentioned above is not used as it is, output to servos is immediately stopped and the robot is stopped as fast as possible. In case of example of FIG. 7, sw5 through sw9 for forming the deceleration step are not outputted to servos.

In this case, the path is deviated by the emergency stop and, therefore, the robot may be returned to the original path (once, positioned) by overriding at a low rate and thereafter it may be accelerated by applying the override changing method mentioned above. Data for calculating a motion amount required for returning to the original path (in case of the example of FIG. 7, data of sw6 through sw9 which remain unoutputted at servo segments by the emergency stop), data of program speed and so on are stored to the memory at a vicinity of a point of emergency stop. Further, also various data for determining the operation after returning to the original path is stored to the memory at a vicinity of the point of emergency stop.

The above-described is the outline of the embodiment. In the following, a detailed explanation will be given of a processing of dynamic speed control which is executed to avoid path deviation of the robot by classifying it into a processing of overriding and a processing of temporary stop (operation restarting). Incidentally, in the explanation, as an example of override rate different from the override rate of 50% ($\beta=50$), a case of the override rate of 30% ($\beta=30$) will be considered.

Figure 8:
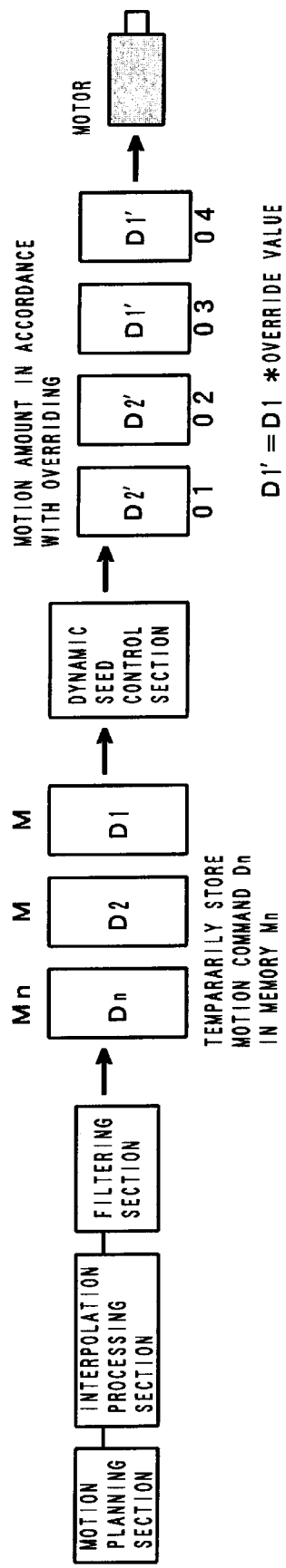
FIG. 8 is a view for explaining in a style slightly different from that in FIG. 4 an outline of processings executed at inside of the robot controller from motion plan to outputting instruction of movement to servos in program reproduction according to the embodiment of the present invention.

FIG. 8 is a view for explaining as to the embodiment of the present invention an outline of processings executed at inside of the robot controller from motion plan to outputting motion command to servos in program reproduction in a style slightly different from that in FIG. 4. In FIG. 4, a description of classification of a series for respective-axes motion and a series for coordinate motion (straight-line motion, circular motion or the like) is omitted, while the overriding processing section having a dynamic shutter is represented as the dynamic speed control section and a memory used in relation to the dynamic speed control is simplified and added to block representation.

In reference to FIG. 8, a total of the system comprises the motion planning section, the interpolation processing section, the filtering section and the dynamic speed control section and an output from the dynamic speed control section is conveyed to the servo system (represented as motor) of respective axes. And, in the flow of processing, there is constructed a constitution in which memories are interposed on the input side and the output side of the dynamic speed control section. The memories are previously prepared with a number of register regions to adapt to processings explained below.

Incidentally, respective register regions can also be referred to simply as memories. Further, n-th motion command after the filtering processing which is outputted from the filtering section is represented by notation Dn. In the drawing, on the input side of the dynamic speed control section, it is illustrated that motion command Dn is stored to a memory Mn. Each block illustrated narrowly in the vertical direction signifies one section of memory (buffer register region). It is illustrated that an input side memory M1 is stored with D1, M2 is stored with D2 and Mn is stored with Dn (n=1, 2), respectively.

Further, it is illustrated that memories 01 through 04 on the output side of the dynamic speed control section are respectively stored with D2, D2', D1 and D1'. Here, notations D2' and D1' designate values of D1 and D2 multiplied by an override value ($\beta/100$). A description will be given of a detail of a method of using the memories on the input side and the output side in explaining the processings as follows.

[$\beta$processing of overriding]

Figure 9:
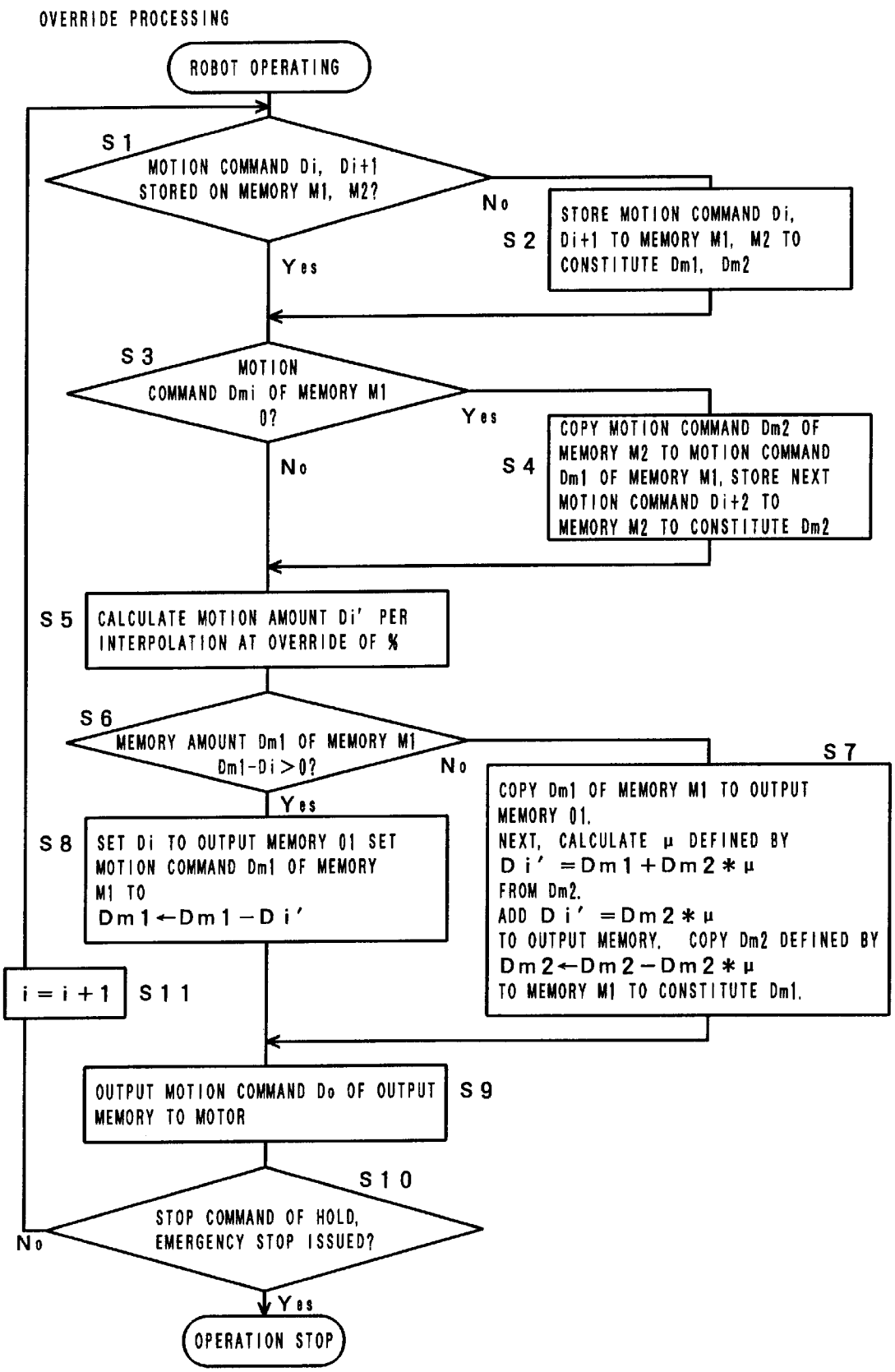
FIG. 9 is a flowchart describing essential points of processings of overriding which is carried out at a dynamic speed control section.

FIG. 9 is a flowchart for explaining processing of overriding that is carried out in the dynamic speed control section. The essential points of the respective steps are as follows. Incidentally, notation "i" is a labeling index of an interpolation period and the initial value is i=1. Further, registers for setting a current value $\beta$ and a target value $\gamma$ of overriding are prepared and in the latter, an override target value $\gamma 0$ is previously set. In respect of the initial value of the current value $\beta$ of overriding, a value coinciding with the target value $\gamma 0$ which has been initially set is automatically set.

(Step S1); Whether respective motion commands Di and Di+1 are stored to the memories M1 and M2 is checked. When they are not stored, the procedure proceeds to Step S2 and when they are stored, the procedure proceeds to Step S3.

(Step S2); The respective motion commands Di and Di+1 are stored to the memories M1 and M2 and are set as motion commands Dm1 and Dm2. In this case, m1 and m2 are labels signifying that they are data stored to the memories M1 and M2.

(Step S3); Whether a value of the motion command Mm1 stored to the memory M1 is 0 is checked. When the determination is YES, the procedure proceeds to Step S4 and when it is NO, the procedure proceeds to Step S5.

(Step S4); The motion command Dm2 stored to the memory M2 is copied to the memory M1 and is set to Dm1 (updating of value of motion command Dm1). And, motion command Di+2 successive to Di+1 is read, stored to the memory M2 and set to Dm2 (updating of value of Dm2).

(Step S5); The current value β% of overriding is determined and under the determined β value, a motion amount (height of segment representing motion amount) Di per interpolation (Per ITP) is calculated. A description will be given later of a method of calculating Di. The current value β of overriding can be changed during the operation when the target value γ is changed. The value of β is changed during the operation in case of input by a user during the operation, change by the outside signal, temporary stop (hold), restarting operation after temporary stop (hold) or emergency stop. A description will later be given of the processing of determining the current value β% of overriding along with processings of temporary stop (hold) and restarting operation thereafter.

(Step S6); Di calculated at Step S5 is compared with motion command Dm1 stored to the memory M1. When Dm1−Di>0, the procedure proceeds to Step S8 and the procedure proceeds to Step S7 otherwise (Dm1−Di≦0).

(Step S7); The motion command Dm1 stored to the memory M1 is copied to memory 01 on the output side. Successively, by using Dm1 and Dm2, $\mu$ defined by the following equation is calculated.

$$Di=Dm1+Dm2*\mu$$

And, Di' defined by Di'=Dm2*$\mu$ is added to the output memory 01 from $\mu$. Further, Dm2 is updated to Dm2=Dm2−Dm2*$\mu$ which is copied to the memory M1 to constitute new Dm1 (updating of Dm1).

(Step S8); The motion command Di determined at Step S5 is written to the output side memory 01. Further, the motion command Dm1 stored to the memory M1 is updated to new Dm1=Dm1−Di.

(Step S9); The motion command Do of the output side memory is outputted to motors (respective axis servo systems).

(Step S10); It is checked whether instruction for stopping the robot such as holding, temporary stop, emergency stop or operation finish instruction (which is outputted when processing at Step S2 cannot be executed since new Di is not outputted from the filtering section) is outputted at inside of the robot controller. When the determination is YES, a processing therefor (mentioned later) is executed and the robot is stopped. When the determination is NO, the procedure proceeds to Step S11.

(Step S11); 1 is added to the index value "i" of the motion command and the operation returns to Step S1.

Here, a description will be given of a method of calculating the motion amount Di' per interpolation (Per ITP) when the overriding (current value) at Step S5 is β%.

In calculating the motion amount Di', the following equation is used to provide speed change smoothly even when the motion command Di outputted from the filtering section is not constant.

The motion command Di' per interpolation time period (ITP) t0 currently at i-th order is represented by the following equation (3).

$$Di'=V(i)*t0 \qquad (3)$$

Here, notation V(i) designates speed when overriding at i-th ITP is set to 100%. Acceleration A(i) per ITP when the overriding at the i-th ITP is set to 100% is represented by the following equation (4).

$$A(i)=V(i)-V(i-1) \qquad (4)$$

In order to make transition of speed smooth, by using A(i), the following equation (5) is adopted as a reference equation of acceleration output at ITP of current i-th order.

$$Aout(i)=-A(i-1)/2+3*A(i)/2 \qquad (5)$$

By using Equation (5), the following equation (6) is adopted as speed output at the current i-th order ITP.

$$Vout(i)=OVR*[V(i)+Aout(i)*(\delta+OVR/2-\tfrac{1}{2})] \qquad (6)$$

Here, OVR=β/100 and δ becomes δ=1 when output of V(i) finishes outputting to the servo system and δ=0 when the output of V(i) does not finish outputting to the servo system.

For example, in case of overriding of 100%, the following equation is established and a natural result is provided.

$$Vout(i)=1*[V(i)+Aout(i)*(0+\tfrac{1}{2}-\tfrac{1}{2})]=V(i)$$

Further, in case of overriding of 50%, the following equation is established.

$$Vout(i) = 0.5*[V(i)+Aout(i)*(\delta+0.5/2-1/2)]$$
$$= V(i)/2+Aout(i)/2*(\delta-1/4)$$

where in case of δ=1; V(i)/2−Aout(i)/8
in case of δ=0; V(i)/2+Aout(i)/8

An explanation will be given of influence of high or low of the override value which effects on the path when the operation is carried out along a path including a corner portion while executing the processing explained above with an example in case of the override rate of 50% in reference to FIGS. 15a, 15b, 15c and 15d and FIGS. 16a, 16b, 16c and 16d.

Figure 14:
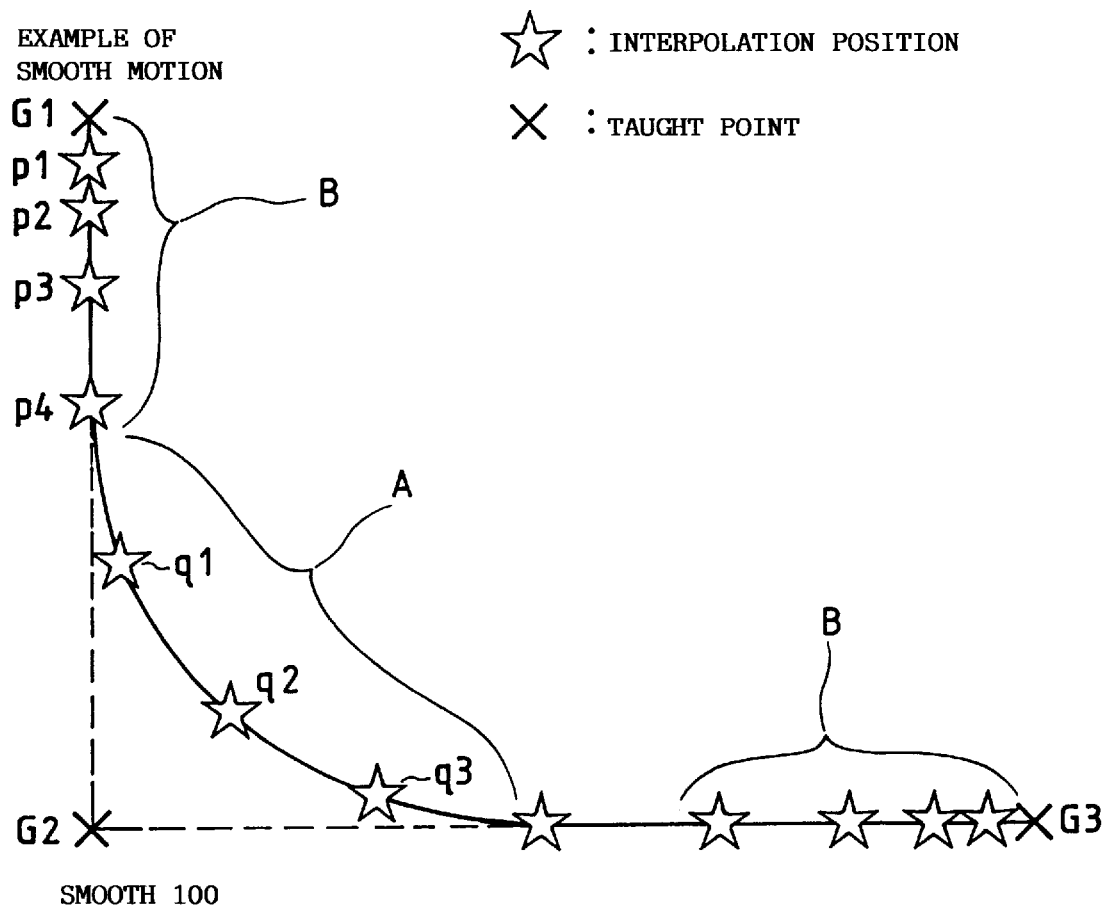
FIG. 14 is a diagram showing operation on a path which is assumed as a premise for explaining FIGS. 15a, 15b, 15c and 15d and FIGS. 16a, 16b, 16c and 16d.

As the operation along a path including a corner portion, as shown in FIG. 14, consider a case in which straight-line motion from position G1 to position G2 and straight-line motion from position G2 to position G3 are smoothly connected. It is assumed that the program speeds of the both operations are equal to each other. X marks represent instruction points G1, G2 and G3 and star marks represent positions of interpolation points (interpolation positions) in correspondence with motion command finally outputted to the servo system. The corner portion is designated by notation A. On the other hand, a range B represents sections of acceleration for starting and deceleration for stopping (Positioning).

In case of this example, although at the corner portion A, speed stays constant and the star marks are arranged at equal intervals, but in the acceleration/deceleration sections B, intervals between the star marks are gradually increased or decreased. Notations q1, q2 and q3 designate interpolation points representing the path at inside of the corner portion A and form a movement section in correspondence with the outputs D1 and D2 from the filtering section at the corner portion.

Further, notations p1, p2, p3 and p4 are interpolation points representing the path in the acceleration section B and form a movement section in correspondence with outputs D1 and D2 from the filtering section in the acceleration/deceleration sections. Incidentally, although the number of interpolation points (star marks) which are actually created is far greater, the interpolation points are simply illustrated by a small number for illustration.

Figure 15B:
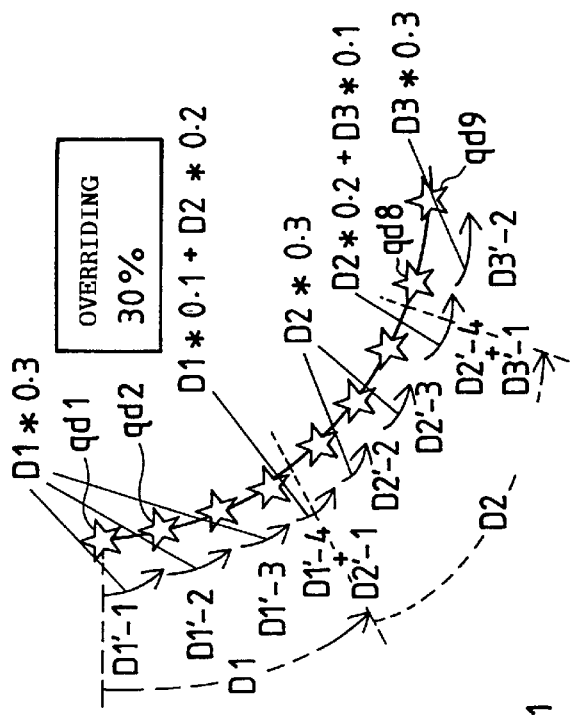
FIGS. 15a, 15b, 15c and 15d are diagrams for explaining influence effected on a path at a corner portion by high or low of an override value in respect of the operation on the path shown by FIG. 14 with an example of a case of an override rate of 30%.
Figure 15D:
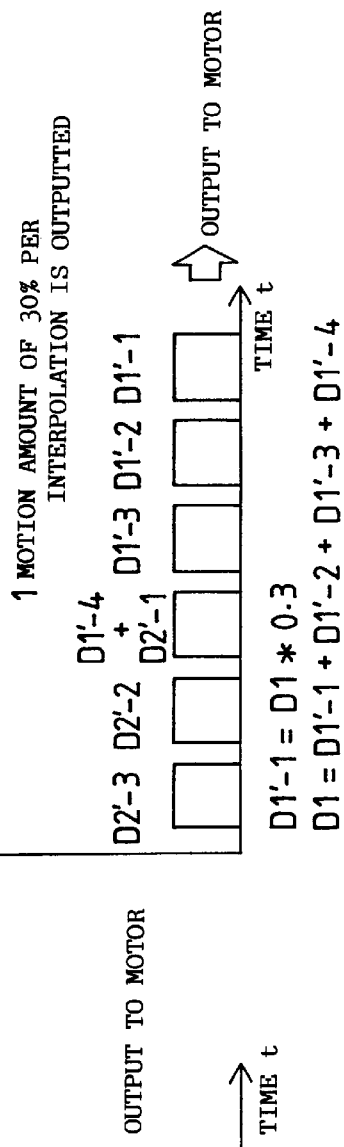
Figure 15A:
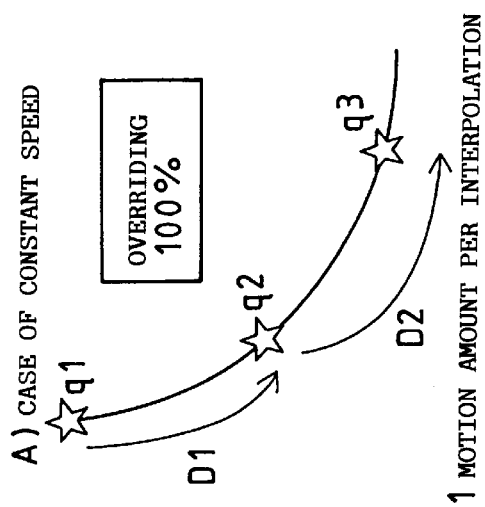

As shown in FIG. 15a, the path of the corner portion A when the robot is operated with overriding of 100% is as shown in FIG. 14 and a path passing through the interpolation points q1, q2 and q3 in correspondence with the outputs D1 and D2 from the filtering section is obtained.

In contrast thereto, a path of the corner portion A when the robot is operated with overriding of 30% is as shown in FIG. 15b. By the processing of overriding (β=30) mentioned above, the interpolation points, q1, q2 and q3 in correspondence with the outputs D1 and D2 from the filtering section are converted into a generator number of interpolation points qd1 through qd9 (notations are illustrated only partially). Calculation equations at respective sections are as illustrated in the drawing.

What is important here is that the interpolation points qd1 through qd9 fall on the original path in case of overriding of 100%. This property is guaranteed similarly even if the override rate is not 30%. Generally, with interpolation points in case of override value of 100% being made a reference, interpolation points of the number inversely proportional to the override value are outputted and they are created to arrange on the path in case of the override value of 100%. Therefore, the same path is obtained also at the corner portion regardless of high or low of the override value.

Figure 15C:
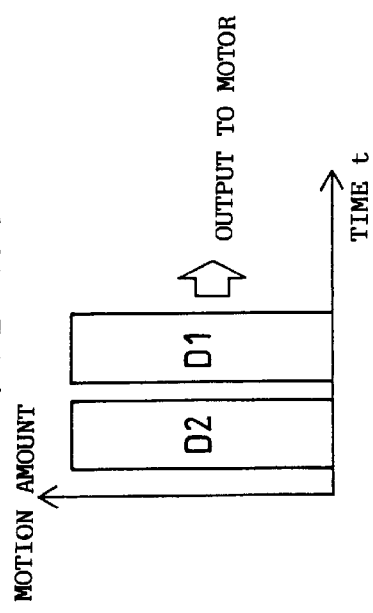

FIG. 15c and FIG. 15d illustrate a behavior of dividedly outputting the motion commands D1 and D2 at the output stage of the filtering section by segments. Like this example, in case of passing through the corner portion at constant speed, the height of the respective segments becomes constant. Incidentally, when the program speeds of two operations forming the corner portion differ from each other, heights of the respective segments are naturally changed in Steps. Also in this case, the path formed by the interpolation points is not influenced by the override rate.

Figure 16A:
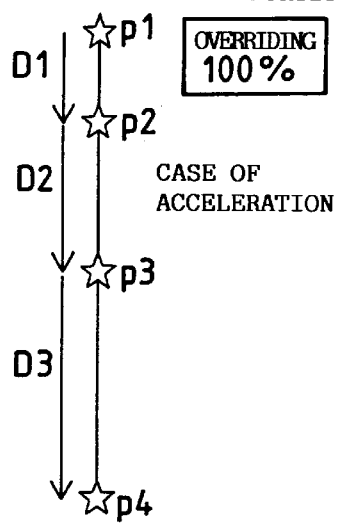
FIGS. 16a, 16b, 16c and 16d are diagrams for explaining influence effected on a path at an accelerating and decelerating portion by high or low of an override value in respect of the operation on the path shown by FIG. 14 with an example of the case of an override rate of 30%.

Next, a study is conducted on the path in the acceleration/deceleration sections with the acceleration section being taken as an example. As shown in FIG. 16a, the path of the acceleration or deceleration portion B (in this case, represented by acceleration portion) when the robot is operated with overriding of 100% is as shown in FIG. 14 and acceleration toward the program speed is carried out along the path passing through the interpolation points p1, p2, p3 and p4 in correspondence with outputs D1, D2 and D3 from the filtering section.

Figure 16B:
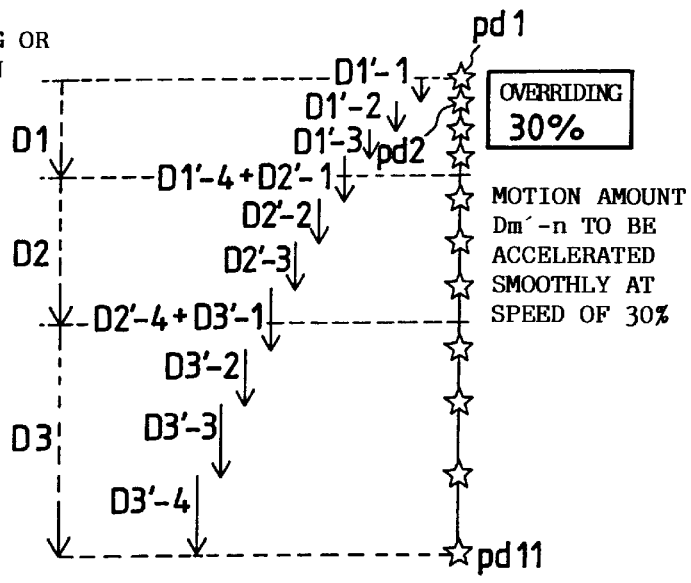

As shown in FIG. 16b, the path of the acceleration portion B when the robot is operated with overriding of 80% is not changed from that in case of overriding of 100%. However, by the processing of overriding (β=30) mentioned above, the interpolation points p1, p2, p3 and p4 in correspondence with the outputs D1, D2 and D3 from the filtering section are converted into a greater number of interpolation points pd1 through pd11 (notations are illustrated only partially). Calculation equations at respective sections are as illustrated in the drawing.

Such a property is guaranteed similarly even if the override rate is not 30%. Generally, with interpolation points in case of override value of 100% being made a reference, interpolation points of the number inversely proportional to the override value are outputted and they are created to arrange on the path in case of the override value of 100%.

Figure 16C:
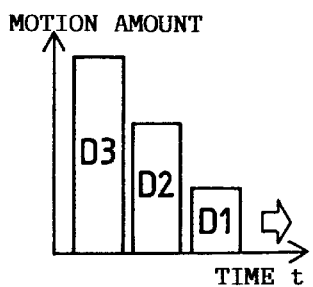
Figure 16D:
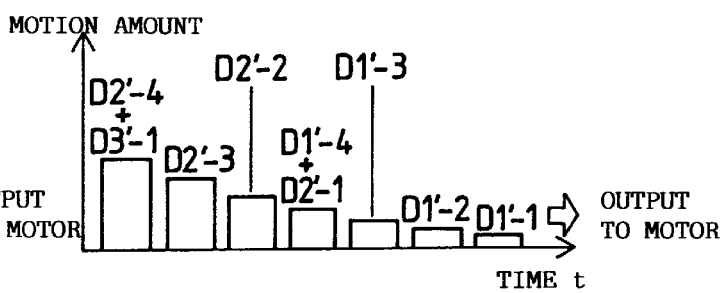

FIG. 16c and FIG. 16d illustrate a behavior of dividedly outputting the motion commands D1, D2 and D3 at the output stage of the filtering section by segments. In the acceleration/deceleration sections, heights of the respective segments are changed in Steps. This change represents a procedure of accelerating smoothly while reducing speed in case of overriding of 100% to 30% thereof (generally β%). The finally reached speed of acceleration naturally becomes 30% of program speed (generally β%).

Figure 17:
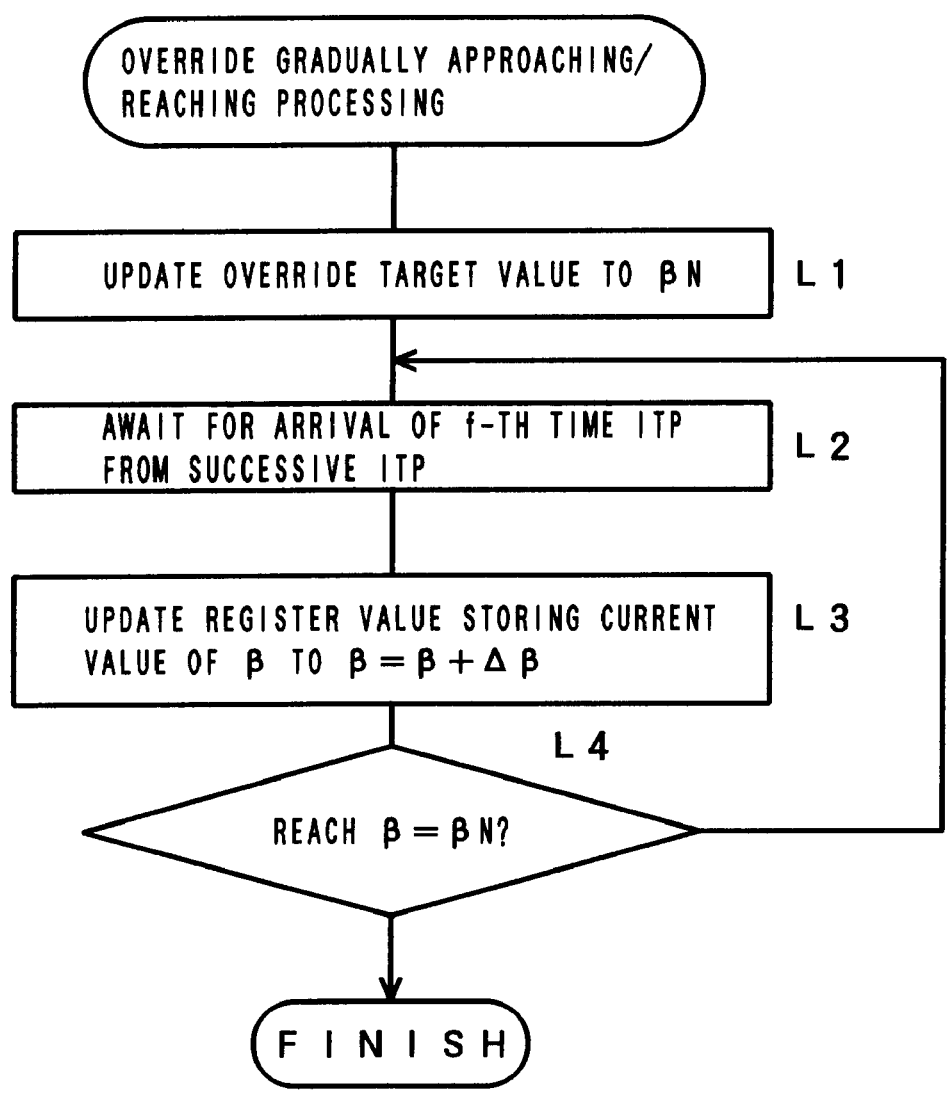
FIG. 17 is a flowchart for explaining gradually approaching/reaching processing of overriding.

When overriding is changed during operating the robot, a processing of gradually approaching/reaching overriding indicated by a flowchart of FIG. 17 is carried out. This processing is utilized also in hold processing or operation restarting processing mentioned later.

Essential points of respective steps of the override gradually approaching/reaching processing are as follows.

(Step L1); The override target value is updated to a new value βN.

(Step L2); Arrival of ITP at "f" times from ITP successive to updating of the override target value is awaited. Notation "f" designates a positive integer value set to a suitable magnitude.

(Step L3); The current value of overriding is updated from β to β+Δβ. Δβ is previously determined to, for example, Δβ=1 (%) or is calculated by the following equation (7).

$$\Delta\beta = (\beta N - \beta \text{ immediately before updating override target value})/n \quad (7)$$

Here, notation "n" designates the number of updating required for the current value of overriding to coincide with the target value and is determined by setting the value to, for example, n=10 or from a separate condition (refer to explanation of hold processing mentioned later). By carrying out such a processing, β in the flowchart of FIG. 9 is changed in steps toward a new target value.

[Hold processing]

Figure 10:
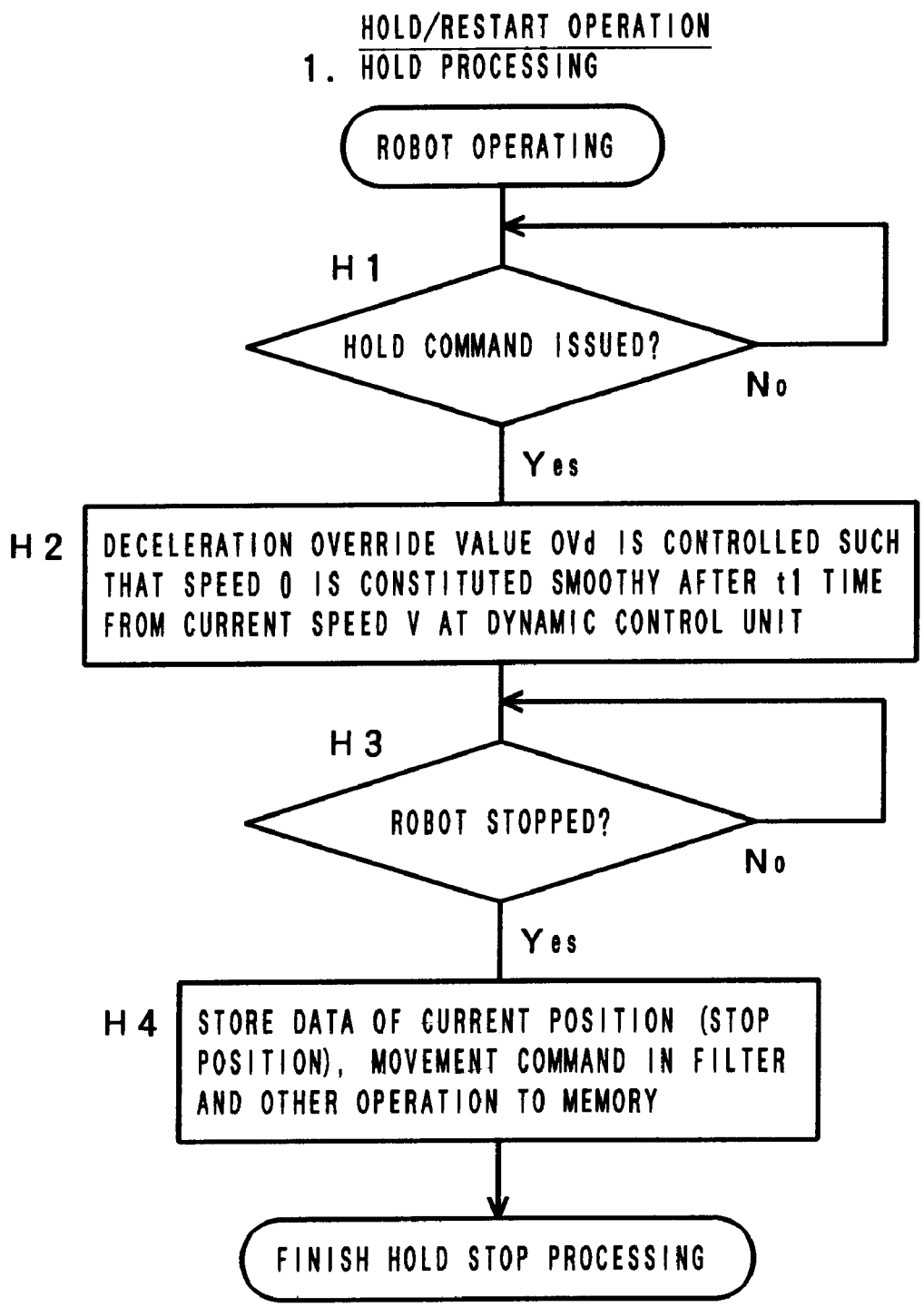
FIG. 10 is a flowchart describing essential points of processings of holding of movement executed in temporary stop at the dynamic speed control section.

FIG. 10 is a flowchart for explaining hold processing which is carried out at the dynamic speed control section. The hold processing is carried out when, for example, an operator inputs instruction of temporary stop to the robot controller. Essential points of the respective steps are as follows.

(Step H1); Whether hold instruction is outputted at inside of the robot controller is checked at each ITP. When it is outputted, the procedure proceeds to Step H2.

(Step H2); A deceleration override value 0 Vd is controlled such that the speed is changed from current speed V to 0 smoothly after elapse of time period of t1 in the dynamic control section.

(Step H3); Whether the robot is stopped is checked at each ITP. When the stop is confirmed, the procedure proceeds to Step H4.

(Step H4); Current position (stop position) at the time point, data of motion command in the filter and other various data in respect of the operation of the robot are stored to the memory (register for storing in holding the operation) and the hold processing is finished.

In controlling the deceleration override value 0 Vd in Step H2, the override gradually approaching/reaching processing shown by the flowchart of FIG. 17 is utilized.

That is, the updating target value βN of overriding at Step L1 is set to βN=0. Further, a value of time period t1 converted into ITP is set to s1 and s1 is divided into η (notation η designates suitable positive integer which is not 1) and "f" at Step L2 is set to f=s1/η. And, "n" in calculation equation (7) of Δβ in Step L3 is calculated by βN=0 and n=η.

Figure 12:
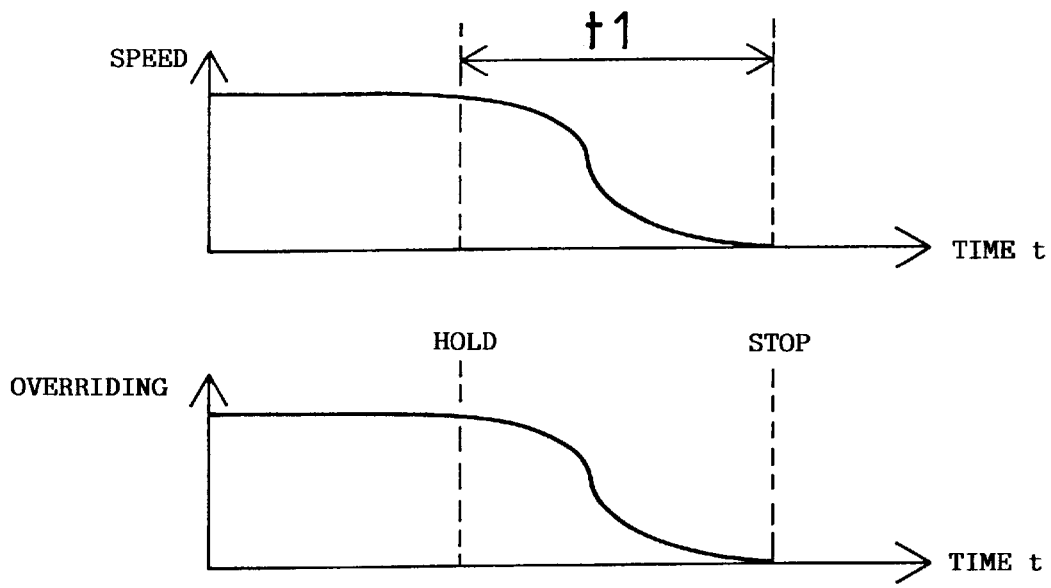
FIG. 12 show diagrams representing transition of speed when processing of holding of movement is executed.

FIG. 12 represents transition of speed when the hold processing mentioned above is carried out. Although overriding is changed toward 0 in steps, in order to totally reflect the overriding to actual speed, motion command needs to be completely outputted to the servo system. Accordingly, the transition of speed is not linearly lowered. Further, in order to make the operation more smooth, smooth transition of acceleration may be provided by gradually changing the value of Δβ in accordance with a smooth function (for example, exponential function) without setting the value to a constant value.

[processing of restarting operation]

Figure 11:
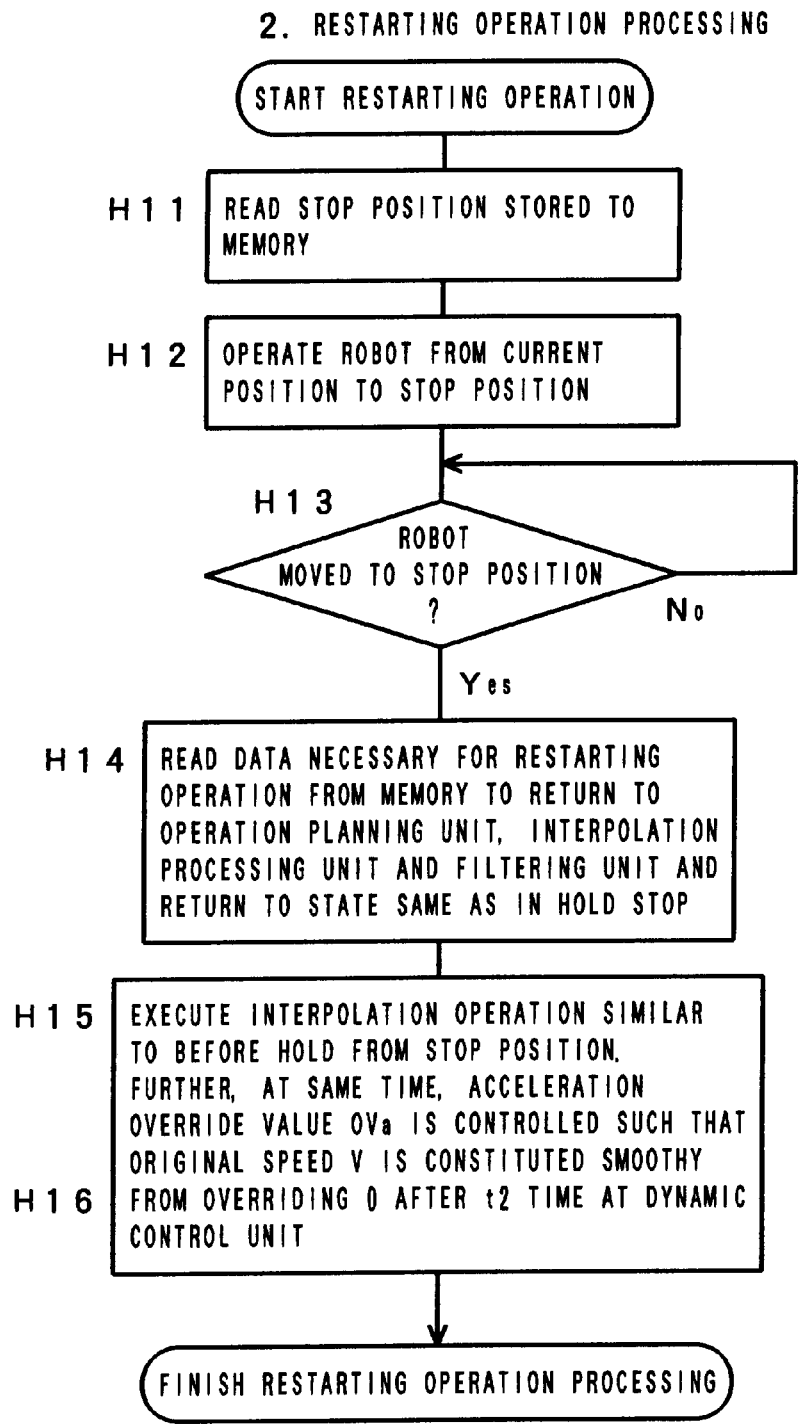
FIG. 11 is a flowchart describing essential points of processings executed in restarting operation after temporary stop at the dynamic speed control section.

FIG. 11 is a flowchart for explaining a processing of restarting operation which is carried out at the dynamic speed control section. The processing of restarting operation is executed when, for example, operation restart instruction is inputted to the robot controller after temporary stop. Essential points of the respective steps are as follows.

(Step H11); A stop position stored to a memory is read.

(Step H12); A robot is operated from current robot position (for example, moved by jog feed) to the stop position read at Step H11.

(Step H13); Completion of operation at Step H12 is confirmed. After confirmation, the procedure proceeds to Step H14.

(Step H14); Data necessary for restarting operation is read from the memory and returned to the motion planning section, the interpolation section and the filtering section and a state immediately before holding operation is recovered.

(Step H15); Interpolation operation similar to that before the holding operation is carried out from the stop position. Further, at the same time, acceleration override value 0 Va is controlled such that the speed is changed from the current override value (β=0) to the original speed "v" smoothly after elapse of a time period of t2 at the dynamic control section.

In controlling the acceleration override value 0 Va in the processing at Step H15, the override gradually approaching/reaching processing shown by the flowchart of FIG. 17 is utilized.

That is, the updating target value βN of overriding at Step L1 is set to a value of β immediately before holding. Further, the value of the time period t2 converted into ITP is set to s2 and s2 is divided into η (notation η designates suitable positive integer which is not 1) and "f" at Step L2 is set to f=s2/η. And, "n" in calculation equation (7) of Δβ at Step L3 is calculated by βN=value 0 of β immediately before holding operation and n=η.

Figure 13:
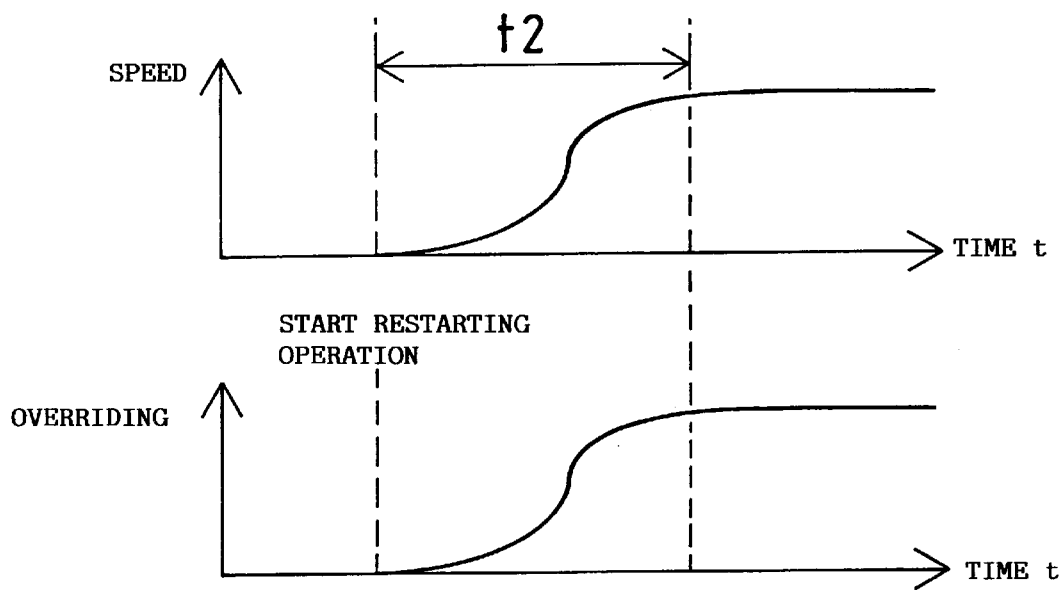
FIG. 13 show diagrams representing transition of speed when processing of gradually enhancing overriding operation in restarting the operation is executed.

FIG. 13 represents transition of speed when the processing at Step H15 is carried out. Although overriding is changed from 0 toward the original value in Steps, in order to totally reflect the overriding to actual speed, motion command needs to be completely outputted to the servo system. Therefore, the transition of speed is not increased linearly. Further, in order to make the operation more smooth, smooth transition of acceleration may be provided by gradually changing the value of Δβ in accordance with a smooth function (for example, exponential function) without setting the value to a constant value.

According to the present invention, there can be prevented path deviation which is caused in the conventional technology in relation to high or low of overriding, switching of overriding during the operation or temporary stop. Further, efficiency, reliability and safety of operation of confirming path by test run after instruction can be promoted thereby. Further, path deviation accompanied by switching of overriding during the operation or temporary stop is eliminated and, therefore, accuracy and safety of robot operation is improved.

What is claimed is:

1. A robot controller having software outputting motion commands to servo motors driving respective axes of a robot, wherein said software:

obtains a motion amount for a motion target portion of the robot and performs interpolation processing on the motion amount at a predetermined period;

performs filtering processing on an output subjected to the interpolation processing for acceleration/deceleration control; and performs processing for override based on said filtering processing so that a path of a tool center point of the robot is not changed irrespective of any designated override values applied to the respective axes.

2. A robot controller for outputting a motion command to a servo system for servo motors for driving respective axes of a robot, said robot controller comprising:

motion plan creating means for creating a motion plan based on an operation program;

interpolation processing means for interpolating an output from said motion plan creating means at a predetermined period;

filtering processing means for filtering an output from said interpolation processing means for an acceleration/deceleration control; and override processing means for performing dynamic override processing based on the filtered data so that a path of a tool center point of the robot is not changed irrespective of any designated override values applied to the respective axes.

3. A robot controller according to claim 2, wherein said override processing means carries out said dynamic overriding processing so that the path of the tool center point of the robot is not changed when the override value is changed in executing the operation program.

4. A robot controller according to claim 3, wherein the override processing means carries out the dynamic override processing so that the tool center point is decelerated to stop along the path of the tool center point drawn in a normal operation by lowering the override value to zero when the robot is temporarily stopped in executing the operation program.

5. A robot controller according to claim 4, wherein said override processing means carries out said dynamic override processing so that in executing the operation program, when the operation is restarted after temporarily stopping the robot, said override value is increased from zero and the tool center point is accelerated along the path of the tool center point drawn in the normal operation and moves with the same path and the same speed as those before the temporary stop.

6. A robot controller according to claim 3, wherein said override processing means carries out said dynamic overriding processing so that in executing the operation program, when the operation is restarted after the robot is stopped by emergency stop, a motion command representing a movement for returning onto the path of the tool center point drawn in a normal operation is outputted to said servo system and, thereafter, said override value is increased to a predetermined value and the tool center point is accelerated along the path of the tool center point drawn in the normal operation and is moved with the same speed and the same path as those before the emergency stop.

7. A robot controller according to claim 3, wherein the override processing means changes said override value by gradually changing a current value of the override toward a target value.

8. A robot controller according to claim 4, wherein said overriding processing means preserves operational data in the vicinity of a time point of the temporary stop and utilizes the preserved operational data in restarting the operation.

9. A robot controller according to claim 2, wherein said motion plan creating means creates a coordinate-motion plan for carrying out a coordinate motion in respect of at least one operational section.

10. A robot controller according to claim 2, wherein said motion plan creating means creates respective axis motion plans for carrying out respective axis operations in respect of at least one operational section.

11. A robot controller controlling a robot comprising:

an interpolation processor interpolating a motion amount for a motion target portion of the robot; and a filter performing filtering using the interpolated motion amount for an acceleration/deceleration control, wherein a path of a tool center point of the robot is not changed irrespective of any designated override value (s).

12. A method for controlling a robot, comprising:

interpolating a motion plan at a predetermined period;

filtering the interpolated motion plan for an acceleration/deceleration control; and performing override processing using the filtered interpolated motion plan, so that a path of a tool center point is not changed irrespective of any override values.

13. A robot controller comprising:

override means for performing an override based on filtered data; and controlling means for controlling a path of a tool center point of a robot so the path is not changed, irrespective of override values.

14. A robot controller for outputting a motion command to a servo system for servo motors for driving respective axes of a robot, said robot controller comprising:

motion plan creating means for creating a motion plan based on an operation program;

interpolation processing means for interpolating an output from said motion plan creating means at a predetermined period;

filtering processing means for filtering an output from said interpolation processing means for an acceleration/deceleration control; and override processing means for performing dynamic override processing based on the filtered data so that a path of a tool center point of the robot is not changed, irrespective of override values.

* * * * *

UNITED STATES PATENT AND TRADEMARK OFFICE
CERTIFICATE OF CORRECTION

PATENT NO. : 6,163,124
DATED : December 19, 2000
INVENTOR(S) : Takayuki Ito, et al.

It is certified that error appears in the above-identified patent and that said Letters Patent is hereby corrected as shown below:

Column 2,
Line 1, after "object" insert -- ( --.

Column 3,
Line 52, change "β" to -- P --.

Column 8,
Line 39, change "aflout" to -- αflout --.

Column 9,
Line 35, change "fiurther" to -- further --.

Column 12,
Line 52, change "βprocessing" to -- processing --.

Column 13,
Line 18, change "Per" to -- per --.

Column 14,
Lines 32 and 34, the "*" (all occurrences) should be moved up one line;
Line 58, change "(Positioning)" to -- (positioning) --.

Column 16,
Line 26, change "/ ↑n(7)" to -- /n --.

Column 17,
Line 10, change "processing" to -- Processing --.

UNITED STATES PATENT AND TRADEMARK OFFICE
CERTIFICATE OF CORRECTION

PATENT NO.    : 6,163,124
DATED         : December 19, 2000
INVENTOR(S)   : Takayuki Ito, et al.

It is certified that error appears in the above-identified patent and that said Letters Patent is hereby corrected as shown below:

Column 18,
Lines 32 and 33, change "overriding" to -- override --.

Signed and Sealed this

Twenty-third Day of October, 2001

*Attest:*

*Attesting Officer*

NICHOLAS P. GODICI
*Acting Director of the United States Patent and Trademark Office*